(12) United States Patent
Zafiris

(10) Patent No.: US 12,508,353 B2
(45) Date of Patent: Dec. 30, 2025

(54) PERITONEAL DIALYSIS SYSTEM USING IDEAL GAS LAW

(71) Applicants: BAXTER INTERNATIONAL INC., Deerfield, IL (US); BAXTER HEALTHCARE SA, Glattpark (CH)

(72) Inventor: John Zafiris, Hawthorn Woods, IL (US)

(73) Assignees: Baxter International Inc., Deerfield, IL (US); Baxter Healthcare SA, Glattpark (CH)

( * ) Notice: Subject to any disclaimer, the term of this patent is extended or adjusted under 35 U.S.C. 154(b) by 781 days.

(21) Appl. No.: 17/721,920

(22) Filed: Apr. 15, 2022

(65) Prior Publication Data

US 2022/0331501 A1      Oct. 20, 2022

Related U.S. Application Data

(60) Provisional application No. 63/176,711, filed on Apr. 19, 2021.

(51) Int. Cl.
   *A61M 1/28* (2006.01)
   *A61M 1/14* (2006.01)
   (Continued)

(52) U.S. Cl.
   CPC .......... *A61M 1/282* (2014.02); *A61M 1/1561* (2022.05); *A61M 1/1562* (2022.05);
   (Continued)

(58) Field of Classification Search
   CPC .... A61M 1/1561; A61M 1/156; A61M 1/159; A61M 1/1662; A61M 1/28; A61M 1/282;
   (Continued)

(56) References Cited

U.S. PATENT DOCUMENTS

| | | |
|---|---|---|
| 4,778,451 A | 10/1988 | Kamen |
| 4,804,360 A | 2/1989 | Kamen |

(Continued)

FOREIGN PATENT DOCUMENTS

EP    0052004 A1    5/1982

OTHER PUBLICATIONS

Written Opinion for PCT Patent Application dated Oct. 5, 2022.
(Continued)

*Primary Examiner* — John Kim
(74) *Attorney, Agent, or Firm* — K&L Gates LLP

(57) ABSTRACT

A peritoneal dialysis system includes a control unit is programmed to cause (i) a pressure sensor to take a first pressure reading of a reference chamber with a pneumatic valve closed, (ii) a pump actuator to pump fresh dialysis fluid through a fresh dialysis fluid pathway into a patient line expandable chamber, expanding the expandable chamber into a dome, (iii) the pneumatic valve to open, allowing the reference chamber to communicate pneumatically with any air in the dome, (iv) the pressure sensor to take a second pressure reading with the pneumatic valve open, (v) the first and second pressure readings to be used with the ideal gas law to determine an amount of air in the dome, and (vi) the amount of air in the dome and a known volume of the dome to be used to determine an amount of fresh dialysis fluid delivered into the expandable chamber.

24 Claims, 10 Drawing Sheets

(51) Int. Cl.
*A61M 1/16* (2006.01)
*A61M 1/34* (2006.01)

(52) U.S. Cl.
CPC .......... *A61M 1/159* (2022.05); *A61M 1/1662* (2014.02); *A61M 1/28* (2013.01); *A61M 1/288* (2014.02); *A61M 1/341* (2014.02); *A61M 1/3431* (2014.02); *A61M 1/3437* (2014.02); *A61M 2205/128* (2013.01); *A61M 2205/3337* (2013.01); *A61M 2205/3379* (2013.01); *A61M 2205/3584* (2013.01); *A61M 2205/505* (2013.01); *A61M 2205/52* (2013.01); *A61M 2209/08* (2013.01)

(58) Field of Classification Search
CPC .. A61M 1/341; A61M 1/3431; A61M 1/3437; A61M 2205/128; A61M 2205/3337; A61M 2205/3379; A61M 2205/3584; A61M 2205/505; A61M 2205/52; A61M 2209/08
See application file for complete search history.

(56) References Cited

U.S. PATENT DOCUMENTS

| | | |
|---|---|---|
| 4,808,161 A | 2/1989 | Kamen |
| 4,816,019 A | 3/1989 | Kamen |
| 4,826,482 A | 5/1989 | Kamen |
| 4,976,162 A | 12/1990 | Kamen |
| 5,088,515 A | 2/1992 | Kamen |
| 5,116,021 A | 5/1992 | Faust et al. |
| 5,178,182 A | 1/1993 | Kamen |
| 5,195,986 A | 3/1993 | Kamen |
| 5,211,201 A | 5/1993 | Kamen et al. |
| 5,241,985 A | 9/1993 | Faust et al. |
| D350,822 S | 9/1994 | Lanigan |
| D350,823 S | 9/1994 | Lanigan |
| 5,349,852 A | 9/1994 | Kamen et al. |
| 5,350,357 A | 9/1994 | Kamen et al. |
| 5,353,837 A | 10/1994 | Faust |
| 5,401,342 A | 3/1995 | Vincent et al. |
| 5,421,823 A | 6/1995 | Kamen et al. |
| 5,431,626 A | 7/1995 | Bryant et al. |
| 5,438,510 A | 8/1995 | Bryant et al. |
| 5,447,286 A | 9/1995 | Kamen et al. |
| 5,474,683 A | 12/1995 | Bryant et al. |
| 5,526,844 A | 6/1996 | Kamen et al. |
| 5,533,389 A | 7/1996 | Kamen et al. |
| 5,540,808 A | 7/1996 | Vincent et al. |
| 5,575,310 A | 11/1996 | Kamen et al. |
| 5,578,012 A | 11/1996 | Kamen et al. |
| 5,628,908 A | 5/1997 | Kamen et al. |
| 5,634,896 A | 6/1997 | Bryant et al. |
| 5,641,892 A | 6/1997 | Larkins et al. |
| 5,713,865 A | 2/1998 | Manning et al. |
| 5,755,683 A | 5/1998 | Houle et al. |
| 5,772,637 A | 6/1998 | Heinzmann et al. |
| 5,782,575 A | 7/1998 | Vincent et al. |
| D398,051 S | 9/1998 | Lanigan et al. |
| D409,748 S | 5/1999 | Lanigan et al. |
| 5,935,105 A | 8/1999 | Manning et al. |
| 5,989,423 A | 11/1999 | Kamen et al. |
| 6,001,201 A | 12/1999 | Vincent et al. |
| 6,041,801 A | 3/2000 | Gray et al. |
| 6,065,941 A | 5/2000 | Gray et al. |
| 6,070,761 A | 6/2000 | Bloom et al. |
| 6,077,246 A | 6/2000 | Kullas et al. |
| 6,118,207 A | 9/2000 | Ormerod et al. |
| 6,164,621 A | 12/2000 | Bouchard et al. |
| 6,165,154 A | 12/2000 | Gray et al. |
| 6,210,361 B1 | 4/2001 | Kamen et al. |
| 6,220,295 B1 | 4/2001 | Bouchard et al. |
| 6,223,130 B1 | 4/2001 | Gray et al. |
| 6,234,997 B1 | 5/2001 | Kamen et al. |
| 6,302,653 B1 | 10/2001 | Bryant et al. |
| 6,316,864 B1 | 11/2001 | Ormerod |
| 6,321,597 B1 | 11/2001 | Demers et al. |
| 6,343,614 B1 | 2/2002 | Gray et al. |
| 6,364,857 B1 | 4/2002 | Gray et al. |
| 6,382,923 B1 | 5/2002 | Gray |
| 6,406,276 B1 | 6/2002 | Normand et al. |
| 6,416,293 B1 | 7/2002 | Bouchard et al. |
| 6,436,072 B1 | 8/2002 | Kullas et al. |
| 6,464,667 B1 | 10/2002 | Kamen et al. |
| 6,485,263 B1 | 11/2002 | Bryant et al. |
| 6,503,062 B1 | 1/2003 | Gray et al. |
| 6,520,747 B2 | 2/2003 | Gray et al. |
| 6,604,908 B1 | 8/2003 | Bryant et al. |
| 6,663,359 B2 | 12/2003 | Gray |
| 6,709,417 B1 | 3/2004 | Houle et al. |
| 6,726,656 B2 | 4/2004 | Kamen et al. |
| 6,749,403 B2 | 6/2004 | Bryant et al. |
| 6,808,369 B2 | 10/2004 | Gray et al. |
| 6,877,713 B1 | 4/2005 | Gray et al. |
| 6,905,479 B1 | 6/2005 | Bouchard et al. |
| 6,973,373 B2 | 12/2005 | Gray et al. |
| 7,066,029 B2 | 6/2006 | Beavis et al. |
| 7,214,210 B2 | 5/2007 | Kamen et al. |
| 7,238,165 B2 | 7/2007 | Vincent et al. |
| 7,306,578 B2 | 12/2007 | Gray et al. |
| 7,320,674 B2 | 1/2008 | Ruddell et al. |
| 7,354,190 B2 | 4/2008 | Demers et al. |
| 7,421,316 B2 | 9/2008 | Gray et al. |
| 7,461,968 B2 | 12/2008 | Demers et al. |
| 7,488,158 B2 | 2/2009 | Demers et al. |
| 7,498,563 B2 | 3/2009 | Mandro et al. |
| 7,507,220 B2 | 3/2009 | Childers et al. |
| 7,544,179 B2 | 6/2009 | Distler et al. |
| 7,559,524 B2 | 7/2009 | Gray et al. |
| 7,632,078 B2 | 12/2009 | Demers et al. |
| 7,632,080 B2 | 12/2009 | Tracey et al. |
| D609,350 S | 2/2010 | Hickey et al. |
| 7,662,139 B2 | 2/2010 | Demers et al. |
| D615,189 S | 5/2010 | McGill et al. |
| D615,190 S | 5/2010 | McGill |
| D615,191 S | 5/2010 | McGill et al. |
| D616,539 S | 5/2010 | McGill |
| 7,726,362 B2 | 6/2010 | Demers et al. |
| 7,766,301 B2 | 8/2010 | Gray et al. |
| D623,289 S | 9/2010 | McGill et al. |
| 7,794,141 B2 | 9/2010 | Perry et al. |
| 7,798,997 B2 | 9/2010 | Kamen et al. |
| D627,470 S | 11/2010 | Hickey et al. |
| D629,906 S | 12/2010 | Hickey et al. |
| 7,853,362 B2 | 12/2010 | Gray et al. |
| D631,548 S | 1/2011 | McGill et al. |
| 7,874,718 B2 | 1/2011 | Demers et al. |
| D637,293 S | 5/2011 | Hickey et al. |
| D637,294 S | 5/2011 | Hickey et al. |
| 7,959,196 B2 | 6/2011 | Dale |
| D641,844 S | 7/2011 | Kim et al. |
| D641,882 S | 7/2011 | Hickey et al. |
| 7,993,050 B2 | 8/2011 | Demers et al. |
| D650,896 S | 12/2011 | McGill et al. |
| 8,069,676 B2 | 12/2011 | Kamen et al. |
| 8,158,102 B2 | 4/2012 | Demers et al. |
| 8,197,439 B2 | 6/2012 | Wang et al. |
| D664,255 S | 7/2012 | Hickey et al. |
| D664,660 S | 7/2012 | Hickey et al. |
| 8,251,953 B2 | 8/2012 | Kamen et al. |
| 8,366,316 B2 | 2/2013 | Kamen et al. |
| 8,366,655 B2 | 2/2013 | Kamen et al. |
| 8,393,690 B2 | 3/2013 | Grant et al. |
| 8,409,143 B2 | 4/2013 | Lanigan et al. |
| 8,414,522 B2 | 4/2013 | Kamen et al. |
| 8,425,471 B2 | 4/2013 | Grant et al. |
| 8,485,800 B2 | 7/2013 | Lanigan et al. |
| 8,491,184 B2 | 7/2013 | Kamen et al. |
| 8,511,105 B2 | 8/2013 | Kamen et al. |
| 8,556,225 B2 | 10/2013 | Gray |
| 8,562,834 B2 | 10/2013 | Kamen et al. |
| 8,584,472 B2 | 11/2013 | Kamen et al. |
| 8,708,950 B2 | 4/2014 | Scarpaci et al. |

(56) References Cited

U.S. PATENT DOCUMENTS

| | | |
|---|---|---|
| 8,731,726 B2 | 5/2014 | Gray et al. |
| 8,784,364 B2 | 7/2014 | Kamen et al. |
| 8,821,475 B2 | 9/2014 | Distler et al. |
| 8,840,581 B2 | 9/2014 | McGill et al. |
| 8,845,587 B2 | 9/2014 | Lanigan et al. |
| 8,881,774 B2 | 11/2014 | Lanier, Jr. et al. |
| 8,961,467 B2 | 2/2015 | Lanigan et al. |
| 8,989,906 B2 | 3/2015 | Gray et al. |
| 8,992,075 B2 | 3/2015 | Kamen et al. |
| 9,022,969 B2 | 5/2015 | Helmore et al. |
| 9,028,440 B2 | 5/2015 | Helmore et al. |
| 9,028,691 B2 | 5/2015 | Grant et al. |
| 9,039,395 B2 | 5/2015 | Gray et al. |
| 9,078,971 B2 | 7/2015 | Scarpaci et al. |
| 9,115,709 B2 | 8/2015 | Gray et al. |
| 9,121,403 B2 | 9/2015 | Lanigan et al. |
| 9,173,996 B2 | 11/2015 | Gray et al. |
| 9,194,392 B2 | 11/2015 | Demers et al. |
| 9,205,188 B2 | 12/2015 | Lanigan et al. |
| 9,248,225 B2 | 2/2016 | Demers et al. |
| 9,248,233 B2 | 2/2016 | Kamen et al. |
| 9,308,318 B2 | 4/2016 | Lanigan et al. |
| 9,309,104 B2 | 4/2016 | Kamen et al. |
| 9,358,332 B2 | 6/2016 | McGill et al. |
| 9,366,781 B2 | 6/2016 | Scarpaci et al. |
| 9,408,966 B2 | 8/2016 | Kamen |
| 9,446,188 B2 | 9/2016 | Grant et al. |
| 9,456,955 B2 | 10/2016 | Lanigan et al. |
| 9,488,167 B2 | 11/2016 | Gray et al. |
| 9,492,611 B2 | 11/2016 | Lanigan et al. |
| 9,494,150 B2 | 11/2016 | Gray et al. |
| 9,494,151 B2 | 11/2016 | Gray et al. |
| 9,535,021 B2 | 1/2017 | Kamen et al. |
| 9,539,379 B2 | 1/2017 | Grant et al. |
| 9,561,317 B2 | 2/2017 | Distler et al. |
| 9,561,318 B2 | 2/2017 | Distler et al. |
| 9,593,678 B2 | 3/2017 | Gray et al. |
| 9,593,679 B2 | 3/2017 | Gray et al. |
| 9,597,442 B2 | 3/2017 | Wilt |
| 9,636,455 B2 | 5/2017 | Kamen et al. |
| 9,675,756 B2 | 6/2017 | Johnston et al. |
| 9,677,555 B2 | 6/2017 | Kamen et al. |
| 9,713,667 B2 | 7/2017 | Distler et al. |
| 9,795,728 B2 | 10/2017 | Grant et al. |
| 9,839,775 B2 | 12/2017 | McGill et al. |
| 9,839,776 B2 | 12/2017 | Helmore et al. |
| 9,861,732 B2 | 1/2018 | Scarpaci et al. |
| 9,867,930 B2 | 1/2018 | Kamen et al. |
| 9,950,110 B2 | 4/2018 | Mandro et al. |
| 9,957,960 B2 | 5/2018 | Lanigan et al. |
| 9,981,079 B2 | 5/2018 | Scarpaci et al. |
| 9,987,407 B2 | 6/2018 | Grant et al. |
| 9,987,410 B2 | 6/2018 | Helmore et al. |
| 10,005,001 B2 | 6/2018 | Kamen et al. |
| 10,010,669 B2 | 7/2018 | Kamen et al. |
| 10,060,867 B2 | 8/2018 | Kamen et al. |
| 10,080,704 B2 | 9/2018 | Lanigan et al. |
| 10,098,996 B2 | 10/2018 | Scarpaci et al. |
| 10,098,998 B2 | 10/2018 | Wilt |
| 10,105,286 B2 | 10/2018 | Lanier, Jr. et al. |
| 10,143,794 B2 | 12/2018 | Lanigan et al. |
| 10,155,174 B2 | 12/2018 | Kamen et al. |
| 10,172,988 B2 | 1/2019 | McGill et al. |
| 10,188,787 B2 | 1/2019 | Lanigan et al. |
| 10,195,330 B2 | 2/2019 | Coll et al. |
| 10,201,647 B2 | 2/2019 | Norris et al. |
| 10,207,048 B2 | 2/2019 | Gray et al. |
| 10,220,135 B2 | 3/2019 | Kamen et al. |
| 10,265,451 B2 | 4/2019 | McGill et al. |
| 10,369,299 B2 | 8/2019 | Kamen et al. |
| 10,383,999 B2 | 8/2019 | Kamen et al. |
| 10,385,851 B2 | 8/2019 | Demers et al. |
| 10,426,889 B2 | 10/2019 | Mandro et al. |
| 10,441,697 B2 | 10/2019 | Kamen et al. |
| 10,485,914 B2 | 11/2019 | Scarpaci et al. |
| 10,500,327 B2 | 12/2019 | Grant et al. |
| 10,500,352 B2 | 12/2019 | Grant et al. |
| 10,578,092 B2 | 3/2020 | Overson et al. |
| 10,668,210 B2 | 6/2020 | Kamen et al. |
| 10,751,467 B2 | 8/2020 | Kamen et al. |
| 10,773,836 B2 | 9/2020 | Lanigan et al. |
| 10,786,624 B2 | 9/2020 | Kamen et al. |
| 10,926,030 B2 | 2/2021 | Lanigan et al. |
| 10,941,760 B2 | 3/2021 | Overson et al. |
| 10,959,914 B2 | 3/2021 | Lanigan, Jr. et al. |
| 10,994,871 B2 | 5/2021 | Grant et al. |
| 10,995,742 B2 | 5/2021 | Kamen et al. |
| 11,024,419 B2 | 6/2021 | Kamen et al. |
| 11,077,965 B2 | 8/2021 | Grant et al. |
| 11,166,877 B2 | 11/2021 | Lanier, Jr. et al. |
| 2004/0091374 A1 | 5/2004 | Gray |
| 2005/0095141 A1 | 5/2005 | Lanigan et al. |
| 2005/0095152 A1 | 5/2005 | Dale |
| 2005/0100450 A1 | 5/2005 | Bryant et al. |
| 2005/0112007 A1 | 5/2005 | Demers et al. |
| 2005/0194048 A1 | 9/2005 | Duggan et al. |
| 2007/0085049 A1 | 4/2007 | Houle et al. |
| 2008/0073610 A1 | 3/2008 | Manning et al. |
| 2008/0108968 A1 | 5/2008 | Demers et al. |
| 2008/0113331 A1 | 5/2008 | Demers et al. |
| 2008/0138223 A1 | 6/2008 | Lanigan et al. |
| 2008/0240929 A1 | 10/2008 | Kamen et al. |
| 2009/0107335 A1 | 4/2009 | Wilt et al. |
| 2009/0185920 A1 | 7/2009 | Lanigan et al. |
| 2010/0204765 A1 | 8/2010 | Hall et al. |
| 2011/0098635 A1 | 4/2011 | Helmore et al. |
| 2012/0209197 A1 | 8/2012 | Lanigan et al. |
| 2016/0144093 A1 | 5/2016 | Demers et al. |
| 2016/0220755 A1 | 8/2016 | Lanigan et al. |
| 2017/0304520 A1 | 10/2017 | Distler et al. |
| 2017/0356435 A1 | 12/2017 | Gray |
| 2018/0055984 A1 | 3/2018 | Grant et al. |
| 2018/0133413 A1 | 5/2018 | Grant et al. |
| 2018/0245584 A1 | 8/2018 | Demers et al. |
| 2018/0256803 A1 | 9/2018 | Helmore et al. |
| 2018/0304169 A1 | 10/2018 | Kamen, Jr. et al. |
| 2018/0361048 A1 | 12/2018 | Scarpaci et al. |
| 2019/0094163 A1 | 3/2019 | Kamen et al. |
| 2019/0099534 A1 | 4/2019 | McGill et al. |
| 2019/0099549 A1 | 4/2019 | Lanigan et al. |
| 2019/0118112 A1 | 4/2019 | Kamen et al. |
| 2019/0167883 A1 | 6/2019 | Girouard et al. |
| 2019/0175827 A1 | 6/2019 | Gray et al. |
| 2019/0298906 A1 | 10/2019 | Childers et al. |
| 2019/0314565 A1 | 10/2019 | McGill et al. |
| 2019/0321535 A1 | 10/2019 | Beavers et al. |
| 2019/0344002 A1 | 11/2019 | McGill et al. |
| 2019/0368488 A1 | 12/2019 | Demers et al. |
| 2020/0023125 A1 | 1/2020 | Mandro et al. |
| 2021/0038798 A1 | 2/2021 | Lindo et al. |

OTHER PUBLICATIONS

International Preliminary Report on Patentability for International Application No. PCT/US2022/025060 dated Apr. 14, 2023.

PERITONEAL DIALYSIS SYSTEM USING IDEAL GAS LAW

PRIORITY CLAIM

This application claims priority to and the benefit of U.S. Provisional Application No. 63/176,711, filed Apr. 19, 2021, having the same title as above, the entire contents of which are incorporated herein by reference and relied upon.

BACKGROUND

The present disclosure relates generally to medical fluid treatments and in particular to dialysis fluid treatments.

Due to various causes, a person's renal system can fail. Renal failure produces several physiological derangements. It is no longer possible to balance water and minerals or to excrete daily metabolic load. Toxic end products of metabolism, such as, urea, creatinine, uric acid and others, may accumulate in a patient's blood and tissue.

Reduced kidney function and, above all, kidney failure is treated with dialysis. Dialysis removes waste, toxins and excess water from the body that normal functioning kidneys would otherwise remove. Dialysis treatment for replacement of kidney functions is critical to many people because the treatment is lifesaving.

One type of kidney failure therapy is Hemodialysis ("HD"), which in general uses diffusion to remove waste products from a patient's blood. A diffusive gradient occurs across the semi-permeable dialyzer between the blood and an electrolyte solution called dialysate or dialysis fluid to cause diffusion.

Hemofiltration ("HF") is an alternative renal replacement therapy that relies on a convective transport of toxins from the patient's blood. HF is accomplished by adding substitution or replacement fluid to the extracorporeal circuit during treatment. The substitution fluid and the fluid accumulated by the patient in between treatments is ultrafiltered over the course of the HF treatment, providing a convective transport mechanism that is particularly beneficial in removing middle and large molecules.

Hemodiafiltration ("HDF") is a treatment modality that combines convective and diffusive clearances. HDF uses dialysis fluid flowing through a dialyzer, similar to standard hemodialysis, to provide diffusive clearance. In addition, substitution solution is provided directly to the extracorporeal circuit, providing convective clearance.

Most HD, HF, and HDF treatments occur in centers. A trend towards home hemodialysis ("HHD") exists today in part because HHD can be performed daily, offering therapeutic benefits over in-center hemodialysis treatments, which occur typically bi- or tri-weekly. Studies have shown that more frequent treatments remove more toxins and waste products and render less interdialytic fluid overload than a patient receiving less frequent but perhaps longer treatments. A patient receiving more frequent treatments does not experience as much of a down cycle (swings in fluids and toxins) as does an in-center patient, who has built-up two or three days' worth of toxins prior to a treatment. In certain areas, the closest dialysis center can be many miles from the patient's home, causing door-to-door treatment time to consume a large portion of the day. Treatments in centers close to the patient's home may also consume a large portion of the patient's day. HHD can take place overnight or during the day while the patient relaxes, works or is otherwise productive.

Another type of kidney failure therapy is peritoneal dialysis ("PD"), which infuses a dialysis solution, also called dialysis fluid, into a patient's peritoneal chamber via a catheter. The dialysis fluid is in contact with the peritoneal membrane in the patient's peritoneal chamber. Waste, toxins and excess water pass from the patient's bloodstream, through the capillaries in the peritoneal membrane, and into the dialysis fluid due to diffusion and osmosis, i.e., an osmotic gradient occurs across the membrane. An osmotic agent in the PD dialysis fluid provides the osmotic gradient. Used or spent dialysis fluid is drained from the patient, removing waste, toxins and excess water from the patient. This cycle is repeated, e.g., multiple times.

There are various types of peritoneal dialysis therapies, including continuous ambulatory peritoneal dialysis ("CAPD"), automated peritoneal dialysis ("APD"), tidal flow dialysis and continuous flow peritoneal dialysis ("CFPD"). CAPD is a manual dialysis treatment. Here, the patient manually connects an implanted catheter to a drain to allow used or spent dialysis fluid to drain from the peritoneal chamber. The patient then switches fluid communication so that the patient catheter communicates with a bag of fresh dialysis fluid to infuse the fresh dialysis fluid through the catheter and into the patient. The patient disconnects the catheter from the fresh dialysis fluid bag and allows the dialysis fluid to dwell within the peritoneal chamber, wherein the transfer of waste, toxins and excess water takes place. After a dwell period, the patient repeats the manual dialysis procedure, for example, four times per day. Manual peritoneal dialysis requires a significant amount of time and effort from the patient, leaving ample room for improvement.

Automated peritoneal dialysis ("APD") is similar to CAPD in that the dialysis treatment includes drain, fill and dwell cycles. APD machines, however, perform the cycles automatically, typically while the patient sleeps. APD machines free patients from having to manually perform the treatment cycles and from having to transport supplies during the day. APD machines connect fluidly to an implanted catheter, to a source or bag of fresh dialysis fluid and to a fluid drain. APD machines pump fresh dialysis fluid from a dialysis fluid source, through the catheter and into the patient's peritoneal chamber. APD machines also allow for the dialysis fluid to dwell within the chamber and for the transfer of waste, toxins and excess water to take place. The source may include multiple liters of dialysis fluid including several solution bags.

APD machines pump used or spent dialysate from the peritoneal chamber, though the catheter, and to the drain. As with the manual process, several drain, fill and dwell cycles occur during dialysis. A "last fill" may occur at the end of the APD treatment. The last fill fluid may remain in the peritoneal chamber of the patient until the start of the next treatment, or may be manually emptied at some point during the day.

In any of the above modalities using an automated machine, the automated machine operates typically with a disposable set, which is discarded after a single use. Depending upon the complexity of the disposable set, the cost of using one set per day may become significant. Also, daily disposables require space for storage, which can become a nuisance for home owners and businesses. Moreover, daily disposable replacement requires daily setup time and effort by the patient or caregiver at home or at a clinic.

It is accordingly desirable to provide a relatively simple, compact APD machine, which operates a simple and cost effective disposable set.

SUMMARY

The present disclosure relates to an automated peritoneal dialysis ("APD") machine or cycler, which in one primary embodiment is part of mechanically driven APD system that uses pressure measurements and ideal gas law calculations for volumetric accuracy. The dialysis fluid pump may be any kind of mechanical pump with no particular volumetric accuracy, wherein the pump is capable of generating positive and negative pressure for pumping fresh dialysis fluid to the patient and used dialysis fluid from the patient, respectively. In the primary embodiment described herein, the dialysis fluid pump is a bellows pump, which includes a reusable portion and a disposable portion. The bellows pump is expanded to draw fresh or used dialysis fluid into the disposable portion and contracted to push fresh or used dialysis fluid from the disposable portion. In alternative embodiments, the dialysis fluid pump may be a peristaltic pump, a lobed pump, centrifugal pump, gear pump, vane pump, for example.

The disposable portion of the dialysis fluid pump communicates fluidly with one or more supply container lines, a patient line and a drain line. In one embodiment, the patient line and the drain line are each provided with a flexible or expandable chamber, such as a circular or elliptical expandable chamber, which may be formed from first and second flexible sheets of plastic. The disposable expandable chambers are aligned with inwardly extending domes formed in a surface of a cycler, which also houses the reusable portion of the dialysis fluid pump. The domes are covered with a reusable diaphragm that flexes with one of the flexible sheets of the chamber when placed under positive pressure. A pneumatic passageway of the cycler extends from each dome to a fixed volume reference chamber. An electrically actuated pneumatic valve is placed along each pneumatic passageway. Pressure sensors, and possibly temperature sensors, are placed on either side of each pneumatic valve so that the pneumatic pressure inside both the dome and the reference chamber may be measured when the pneumatic valve is closed.

The APD system is configured to use the flexible or expandable chamber of the disposable set and the mating dome and reference chamber arrangement of the cycler for the patient line to measure, under positive pressure, incremental volumes of fresh dialysis fluid delivered to the patient. The incremental volumes in an embodiment are pressurized to a desired safe pumping pressure for the patient, e.g., three psig, by opening an inlet valve to the flexible or expandable chamber and closing an outlet valve from the flexible or expandable chamber. Once the desired patient pumping pressure is reached, the inlet valve is closed and the outlet valve is opened, allowing the fresh dialysis fluid, positively pressurized to a safe patient pressure, to be pushed to the patient. The inlet and outlet fluid valves may be electrically actuated solenoid pinch valves that are spring closed and energized open for fail safe operation upon power loss.

To accurately measure the incremental volume of fresh dialysis fluid delivered to the patient, while the chamber inlet valve is open and the chamber outlet valve is closed to fill the chamber with fresh dialysis fluid, the pneumatic valve is closed to isolate the dome from the reference chamber. Once the desired pumping pressure is reached (as measured by the dome pressure sensor), a first pneumatic pressure (and possibly temperature) reading for the reference chamber is taken by the reference chamber pressure sensor. The chamber inlet valve is then closed and with the chamber outlet valve still closed, the pneumatic valve to the reference chamber is then opened and the pneumatic pressure between the dome and the reference chamber is allowed to equalize. The dome and reference chamber pressure sensors at this point read the same value, which is slightly less than the set pressure, e.g., three psig. Since the volume of the reference chamber (before) is known, and the before and after pressures have been measured and are thus known, the after volume may then be calculated using the ideal gas law $P1*V1=P2*V2$ (where before and after temperatures may or may not be factored in), wherein the measured volume is of any air that may reside in the dome (outside the expandable chamber and/or within the dialysis fluid). The incremental fresh dialysis fluid volume delivered to the dome (assumed to be the incremental fresh dialysis fluid volume delivered to the patient) is then the known volume of the dome less the calculated increase in air volume (V2−V1).

The fresh dialysis fluid is sourced from a dialysis fluid supply container, which may operate with a batch heater. Where batch heating is provided and the initial dialysis fluid supply container has been emptied, the dialysis fluid pump may pump from a second dialysis fluid supply container directly into the first dialysis fluid supply container associated with the batch heater, e.g., during a patient dwell, bypassing the flexible or expandable chamber since volumetric accuracy and pressure control for this operation is not critical. In an alternative embodiment, an inline heater is provided to heat dialysis fluid flowing through the patient line as it is being delivered to the patient.

The APD system is configured to use the flexible or expandable chamber of the disposable set and the mating dome and reference chamber arrangement of the cycler for the drain line to measure, under positive pressure, incremental volumes of used dialysis fluid delivered to drain, e.g., a drain container or house drain. The incremental volumes in an embodiment are pressurized to a desired safe system pressure since this operation is isolated from the patient. The safe system pressure may be significantly higher than the patient pumping pressures, which is again achieved by opening an inlet valve to the flexible or expandable chamber and closing an outlet valve from the flexible or expandable chamber. Once the desired system pressure is reached, the inlet valve is closed and the outlet valve is opened, allowing the used dialysis fluid, positively pressurized to a safe system pressure, to push used dialysis fluid to the drain.

Volume measurements for the incremental volumes of used dialysis fluid delivered to drain are performed in the same manner as described above for the patient incremental volumes, except here the disposable chamber and associated fluid valves, reusable cycler dome, reference chamber, pneumatic isolation valve and associated pressure and possibly temperature sensors for the drain line are used instead. Used dialysis fluid is sourced from the patient and thus passes in a reverse direction through the patient line expandable chamber of the disposable set. Because the patient line expandable chamber is placed under negative pressure via the dialysis fluid pump during draining, it is contemplated to provide the patient line expandable chamber with a liquid permeable mesh that prevents the flexible sheets forming the patient line expandable chamber from collapsing together under negative pressure.

As mentioned above, in one primary embodiment the dialysis fluid pump is a bellows pump, which includes a reusable portion and a disposable portion. The reusable portion of the bellows pump may include two clamshell halves that are hinged together and are provided as part of the cycler. A sliding spring-loaded latch is provided, which slides back and forth to hold a free end of one of a pair of rigid disposable bellows disks. The latch operates with one of the clamshell halves, e.g., an upper clamshell half to trap and hold the free end of an, e.g., upper, rigid disposable bellows disk. The other clamshell half, e.g., the lower clamshell half, includes or defines a notch that accepts the other e.g., lower, rigid disposable bellows disk. Thus to load the bellows disposable in one example, the user opens the clamshell halves and places one of the disposable bellows disks, e.g., the lower disk, in the lower clamshell half and the slides the free end of that bellows disk into the notch. The user then slides the latch open so that the upper bellows disk may be placed against the upper clamshell half, after which the latch is released and self-biased closed, so that the bellows disposable is locked removeably in place for operation during an APD treatment.

The pair of rigid disposable bellows disks are sealed within a flexible plastic container or bag that receives and discharges fresh and used dialysis fluid as the rigid disposable bellows disks are angled apart and angled together respectively. The rigid disposable bellows disks may be hinged together, e.g. via a living hinge, at their non-free ends, wherein the container or bag follows the radius of the hinge. The container or bag at the free ends of the rigid disposable bellows disks is in one embodiment tensioned via a reusable spring-loaded tensioner provided by the cycler between the first and second clamshell halves. The tensioner ensures that the container or bag remains taught about the rigid disposable bellows disks throughout the pumping process using the bellows pump. When the rigid disposable bellows disks are angled apart, the container or bag straightens, causing the spring of the spring-loaded tensioner to compress. When the rigid disposable bellows disks are angled together, the container or bag folds, allowing the spring of the spring-loaded tensioner to expand to maintain the container in a taught state.

The disposable set of the first primary embodiment may include first and second flexible polymer or plastic sheets that form the container about the rigid disposable bellows disks and also form fluid passageways extending to and sealing to tubes leading to dialysis fluid supply containers, the patient and the drain. The passageways may form valve seats for operating with fluid valves, such as pinch valves. The first and second sheets also form the patient line and drain line disposable expandable chambers that align with the inwardly extending domes formed in a surface, e.g., clamshell surface, of the cycler. An additional bypass passageway may be provided that extends from the disposable expandable patient line chamber to the drain line, e.g., downstream from the disposable expandable drain line chamber for priming and other purposes. The disposable set is accordingly relatively simple, consisting primarily of the first and second sheets, the rigid disposable bellows disks, tubing and containers, such as dialysis fluid supply containers and possibly a drain container.

The cycler in the first primary embodiment includes a motor and a gear or a gearhead motor that includes a set of built-in gears, e.g., helical gears. The gears are provided in a ratio that slows the rotational output of the motor to a frequency that corresponds to a desired pumping frequency. In one embodiment, a single rotation of the motor corresponds to an opening and closing of the bellows disposable. In one embodiment, a shaft extending from the gear or gearhead motor is connected to a collar or pulley. A linkage is connected rotatably to the collar at one end and is connected rotatably at the other end to one of the clamshell halves, e.g., the upper clamshell half. The gear or gearhead shaft turns the collar or pulley at the geared down rotational speed, which causes the linkage to move from say six o'clock to twelve o'clock, thereby opening the bellows disposable and drawing fresh or used dialysis fluid into same. The gear or gearhead shaft further turns the collar or pulley at the geared down rotational speed, which causes the linkage to move back from twelve o'clock to six o'clock, thereby closing the bellows disposable and pushing fresh or used dialysis fluid from same.

The cycler in the first primary embodiment is configured to vary the speed of the motor to achieve a desired fresh or used dialysis fluid flowrate and pressure. Pushing fresh dialysis fluid to the patient or drawing used dialysis fluid from the patient is controlled to be within safe patient pumping limits, e.g., at or below three psig for positive pressure patient pumping or at or below −1.5 psig for negative pressure patient pumping. Other pumping, such as pumping used dialysis fluid to drain or fresh dialysis fluid into the bellows disposable or to a heating container may be performed at a higher safe system pressure because the patient is not involved in such pumping.

The cycler in the first embodiment may use batch or inline heating. If inline heating is used, the inline heater may operate with the patient line and heat dialysis fluid as it is delivered to the patient. If batch heating is used, an initial dialysis fluid supply container may be placed on a batch heater. After heated, fresh dialysis fluid is pumped from the initial dialysis fluid supply container, fresh dialysis fluid may be pumped from a second or third supply container to the first supply container, e.g., during a patient dwell, for heating in preparation for a next patient fill. In the case of batch heating then, an additional destination for fresh dialysis fluid may be the initial supply container for heating.

A control unit for the first primary embodiment for the APD cycler is provided for powering and controlling the motor, pinch valves and heater. The control unit also receives signals from the pressure and temperature sensors, to determine the incremental volumes using the ideal gas law as described herein, to control fresh and used dialysis fluid pumping pressures and to control the inline or batch heater. The control unit also operates bidirectionally with a user interface to output treatment data to the user interface and to receive commands from same.

The cycler in a second primary embodiment operates on the same principals as the first primary embodiment, in which a mechanism for delivering fresh, heated dialysis fluid to the patient is provided, and which includes the disposable expandable patient and drain line chambers that enable incremental fresh and used dialysis fluid volumes to be measured and accumulated. The valve sequence and pressure measurements for use in the ideal gas law calculation are the same as described above for the first primary embodiment.

One main difference for the second primary embodiment is the provision of a peritoneal dialysis ("PD") cart that includes an upper compartment that holds fresh dialysis fluid containers and a lower compartment that holds used dialysis fluid or drain container(s). The upper compartment may be insulated and include heaters, e.g., electrical resistance heaters for warming the fresh dialysis fluid containers. The cart also provides the pneumatic valve, fluid valve actuators, and the inwardly extending domes for operating with the expandable patient and drain line chambers. The cart further provides an automated mechanism for delivering fresh, heated dialysis fluid to the patient. The automated mechanism may include, for example, a press plate driven by one or more lead or ball screw(s), which is/are in turn driven by a motor and a timing belt and pulley assembly.

In one implementation of the second primary embodiment, the automated mechanism drives fresh, heated dialysis fluid to the patient. The system is configured, however, such that used dialysis fluid from the patient is gravity fed to a drain container placed in the bottom of the cart. The used dialysis fluid gravity flows from the patient, through the disposable expandable patient line chamber and into the disposable expandable drain line chamber where it is volumetrically measured.

A control unit for the second primary embodiment for the APD cycler is also provided for powering and controlling the motor, pinch valves and heater. The control unit also receives signals from pressure and temperature sensors to determine the incremental volumes using the ideal gas law as described herein to control fresh and used dialysis fluid pumping pressures and to control the inline or batch heater. The control unit also operates bidirectionally with a user interface to output treatment data to the user interface and to receive commands from same.

In light of the disclosure set forth herein, and without limiting the disclosure in any way, in a first aspect, which may be combined with any other aspect or portion thereof, a peritoneal dialysis system comprises a cycler including a pump actuator configured to pump fresh dialysis fluid, a dome formed in a portion of a cycler housing, a reference chamber provided in the cycler housing, a valve positioned and arranged to open and close a pneumatic pathway extending between the reference chamber and the dome, a pressure sensor associated with the reference chamber, and a control unit; and a disposable set including a patient line expandable chamber positionable against the dome for operation, a fresh dialysis fluid pathway extending to the patient line expandable chamber for carrying fresh dialysis fluid pumped by the pump actuator to the patient line expandable chamber, wherein the control unit is configured to cause (i) the pressure sensor to take a first pressure reading of the reference chamber with the valve closed, (ii) the pump actuator to pump fresh dialysis fluid through the fresh dialysis fluid pathway into the patient line expandable chamber, expanding the expandable chamber into the dome, (iii) the valve to open, allowing the reference chamber to communicate pneumatically with any air in the dome, (iv) the pressure sensor to take a second pressure reading with the valve open, (v) the first and second pressure readings to be used with the ideal gas law to determine an amount of air in the dome, and (vi) the amount of air in the dome and a known volume of the dome to be used to determine an amount of fresh dialysis fluid delivered into the expandable chamber.

In a second aspect, which may be combined with any other aspect or portion thereof, the pressure sensor is a first pressure sensor, and which includes a second pressure sensor associated with the dome, and wherein the control unit is configured to take at least one pressure reading from the second pressure sensor to control fresh dialysis fluid discharge pressure from the patient line expandable chamber.

In a third aspect, which may be combined with any other aspect or portion thereof, the cycler includes a dialysis fluid inlet valve operable with the disposable set upstream of the patient line expandable chamber and a dialysis fluid outlet valve operable with the disposable set downstream of the patient line expandable chamber.

In a fourth aspect, which may be combined with any other aspect or portion thereof, the control unit is configured to cause at least one of (a) the dialysis fluid inlet valve to be open and the dialysis fluid outlet valve to be closed during (ii), (b) the dialysis fluid inlet and outlet valves to be closed during (iii), or (c) the dialysis fluid inlet and outlet valves to be closed during (iv).

In a fifth aspect, which may be combined with any other aspect or portion thereof, the control unit is further configured to cause the dialysis fluid outlet valve to open with the dialysis fluid inlet valve closed to discharge fresh dialysis fluid from the patient line expandable chamber after the pressure sensor takes the second pressure reading.

In a sixth aspect, which may be combined with any other aspect or portion thereof, the control unit is further configured to repeat (i) to (vi) and the opening of the dialysis fluid outlet valve to discharge fresh dialysis fluid until a prescribed patient fill volume of fresh dialysis fluid is delivered to a patient.

In a seventh aspect, which may be combined with any other aspect or portion thereof, the cycler further includes at least one dialysis fluid supply valve operable with the disposable set to open or occlude at least one at least one dialysis fluid supply container.

In an eighth aspect, which may be combined with any other aspect or portion thereof, the pump actuator is a bellows pump actuator, wherein the disposable set includes pair of rigid disposable bellows disks sealed within a flexible plastic container, the flexible plastic container in fluid communication with the fresh dialysis fluid pathway.

In a ninth aspect, which may be combined with any other aspect or portion thereof, the pump actuator is a peristaltic pump actuator, wherein the disposable set includes a peristaltic pumping tube in fluid communication with the fresh dialysis fluid pathway.

In a tenth aspect, which may be combined with any other aspect or portion thereof, the pump actuator is a press plate provided with a peritoneal dialysis cart, the press plate positioned and arranged to press at least one fresh dialysis fluid supply container in fluid communication with the fresh dialysis fluid pathway.

In an eleventh aspect, which may be combined with any other aspect or portion thereof, the cart includes a lower compartment for holding a drain container, and wherein used dialysis fluid is able to gravity drain from a patient into the drain container.

In a twelfth aspect, which may be combined with any other aspect or portion thereof, the cycler further includes a temperature sensor associated with the reference chamber, and wherein the control unit is further configured to use at least one reading from the temperature sensor with the ideal gas law determination in (v) to improve accuracy.

In a thirteenth aspect, which may be combined with any other aspect or portion thereof, the dome is covered by a reusable flexible diaphragm that flexes with the patient line expandable chamber.

In a fourteenth aspect, which may be combined with any other aspect or portion thereof, the dome is a first dome, the reference chamber is a first reference chamber, the valve is a first valve and the pressure sensor is a first pressure sensor, the disposable set further including a drain line expandable chamber positionable against the second dome for operation and a used dialysis fluid pathway extending to the drain line expandable chamber, wherein the cycler further includes a second dome formed in a second portion of the cycler housing, a second reference chamber provided in the cycler housing, a second valve positioned and arranged to open and close a pneumatic pathway extending between the second reference chamber and the second dome, and a second pressure sensor associated with the second reference chamber, wherein the control unit is configured to cause (i) the second pressure sensor to take a first pressure reading of the second reference chamber with the valve closed, (ii) used dialysis fluid to be delivered through the used dialysis fluid pathway into the drain line expandable chamber, expanding the drain line expandable chamber into the second dome, (iii) the second valve to open, allowing the second reference chamber to communicate pneumatically with any air in the second dome, (iv) the second pressure sensor to take a second pressure reading with the second valve open, (v) the first and second pressure readings to be used with the ideal gas law to determine an amount of air in the second dome, and (vi) the amount of air in the second dome and a known volume of the second dome to be used to determine an amount of used dialysis fluid delivered into the drain line expandable chamber.

In a fifteenth aspect, which may be combined with any other aspect or portion thereof, the pump actuator is configured to pump used dialysis fluid through the used dialysis fluid pathway into the drain line expandable chamber.

In a sixteenth aspect, which may be combined with any other aspect or portion thereof, the peritoneal dialysis system is configured such that used dialysis fluid is gravity fed into the drain line expandable chamber.

In a seventeenth aspect, which may be combined with any other aspect or portion thereof, the disposable set is configured such that used dialysis fluid flows through the patient line expandable chamber prior to delivery to the drain line expandable chamber.

In an eighteenth aspect, which may be combined with any other aspect or portion thereof, the used dialysis fluid is pulled through the patient line expandable chamber under negative pressure, and wherein the patient line expandable chamber is provided with a structure that prevents the patient line expandable chamber from occluding under the negative pressure.

In a nineteenth aspect, which may be combined with any other aspect or portion thereof, the peritoneal dialysis system includes a third pressure sensor associated with the dome, and wherein the control unit is configured to take at least one pressure reading from the third pressure sensor to control used dialysis fluid discharge pressure from the drain line expandable chamber.

In a twentieth aspect, which may be combined with any other aspect or portion thereof, the cycler includes a dialysis fluid inlet valve operable with the disposable set upstream of the drain line expandable chamber and a dialysis fluid outlet valve operable with the disposable set downstream of the drain line expandable chamber.

In a twenty-first aspect, which may be combined with any other aspect or portion thereof, the control unit is configured to cause at least one of (a) the dialysis fluid inlet valve to be open and the dialysis fluid outlet valve to be closed during (ii), (b) the dialysis fluid inlet and outlet valves to be closed during (iii), or (c) the dialysis fluid inlet and outlet valves to be closed during (iv).

In a twenty-second aspect, which may be combined with any other aspect or portion thereof, the control unit is further configured to cause the dialysis fluid outlet valve to open with the dialysis fluid inlet valve closed to discharge used dialysis fluid from the drain line expandable chamber after the second pressure sensor takes the second pressure reading.

In a twenty-third aspect, which may be combined with any other aspect or portion thereof, the control unit is further configured to repeat (i) to (vi) of the fourteenth aspect and the opening of the dialysis fluid outlet valve to discharge used dialysis fluid until a patient drain is determined to be completed.

In a twenty-fourth aspect, which may be combined with any other aspect or portion thereof, a peritoneal dialysis system comprises a cart including a pump actuator, a dome, a reference chamber, a valve positioned and arranged to open and close a pneumatic pathway extending between the reference chamber and the dome, a pressure sensor associated with the reference chamber, and a control unit; and a disposable set including at least one fresh dialysis fluid supply container supported by the cart and positioned so as to be actuated by the pump actuator, a patient line expandable chamber positionable against the dome for operation, a fresh dialysis fluid pathway extending to the patient line expandable chamber for carrying fresh dialysis fluid from the at least one fresh dialysis fluid supply container to the patient line expandable chamber, wherein the control unit is configured to cause (i) the pressure sensor to take a first pressure reading of the reference chamber with the valve closed, (ii) the pump actuator to pump fresh dialysis fluid through the fresh dialysis fluid pathway into the patient line expandable chamber, expanding the expandable chamber into the dome, (iii) the valve to open, allowing the reference chamber to communicate pneumatically with any air in the dome, (iv) the pressure sensor to take a second pressure reading with the valve open, (v) the first and second pressure readings to be used with the ideal gas law to determine an amount of air in the dome, and (vi) the amount of air in the dome and a known volume of the dome to be used to determine an amount of fresh dialysis fluid delivered into the expandable chamber.

In a twenty-fifth aspect, any of the features, functionality and alternatives described in connection with any one or more of FIGS. 1 to 10 may be combined with any of the features, functionality and alternatives described in connection with any other of FIGS. 1 to 10.

It is accordingly an advantage of the present disclosure to provide a relatively volumetrically accurate automated peritoneal dialysis ("APD") cycler.

It is another advantage of the present disclosure to provide an APD cycler that achieves relatively precise pressure control.

It is a further advantage of the present disclosure to provide a relatively quiet APD cycler.

It is still another advantage of the present disclosure to provide an APD system that is able to build motive fluid or pumping pressure in a relatively simple manner.

It is yet another advantage of the present disclosure to provide an APD system that employs a relatively low cost disposable set.

Still further, it is an advantage of the present disclosure to provide an APD system that is capable of pumping a high flowrate using a relatively small disposable.

Additional features and advantages are described in, and will be apparent from, the following Detailed Description and the Drawings. The features and advantages described herein are not all-inclusive and, in particular, many additional features and advantages will be apparent to one of ordinary skill in the art in view of the drawings and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

BRIEF DESCRIPTION OF THE FIGURES

FIG. 6 is an elevation sectioned view of a relevant portion of the cycler and disposable set of the first primary embodiment of present disclosure performing a negative pressure used dialysis fluid pass-through.

DETAILED DESCRIPTION

Figure 1:
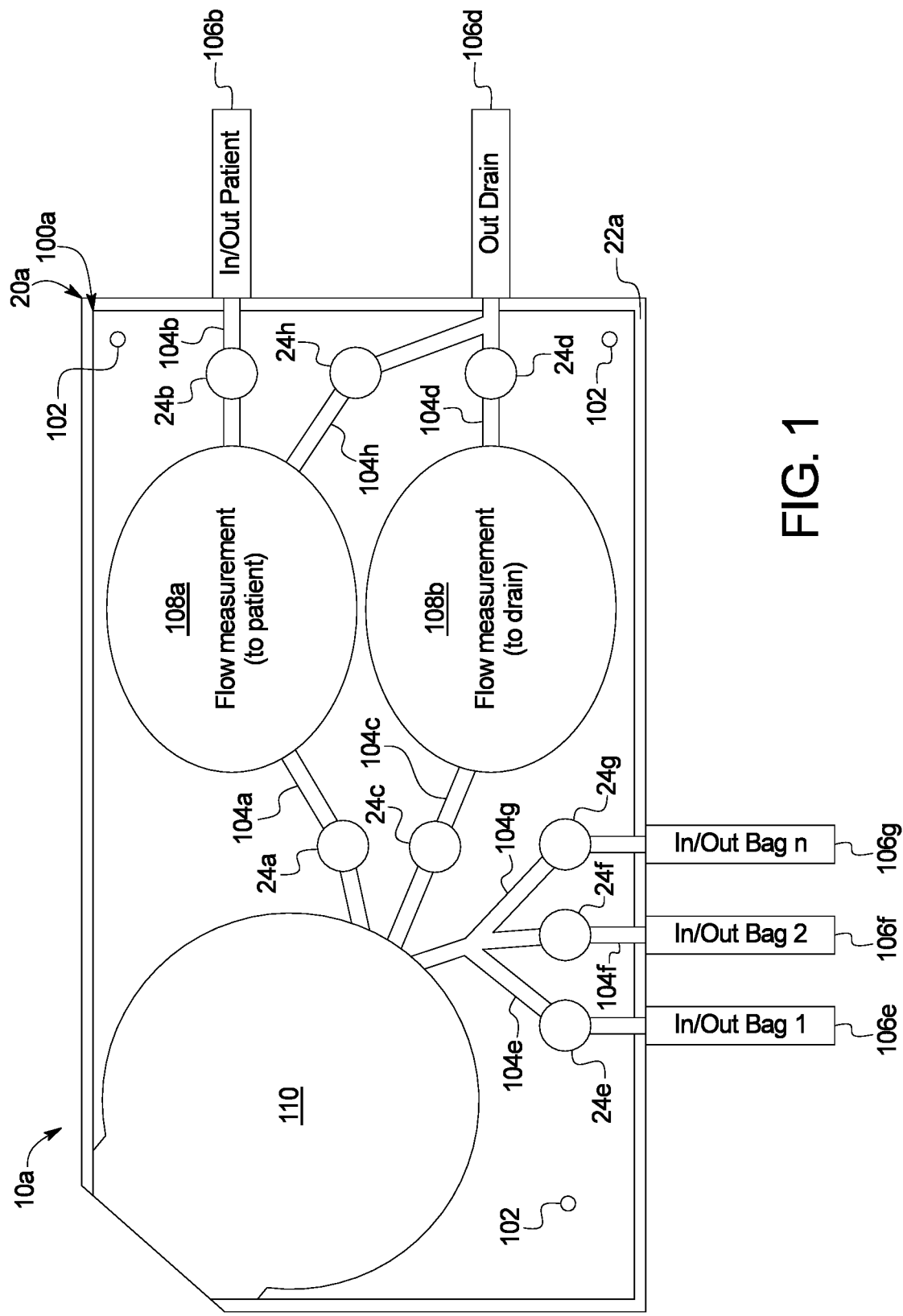
FIG. 1 is a top plan view of a first primary embodiment for a disposable set operable with an automated peritoneal dialysis ("APD") cycler of the present disclosure.

The present disclosure relates to an automated peritoneal dialysis ("APD") machine or cycler, which in one primary embodiment is part of a mechanically driven APD system that uses pressure measurements and ideal gas law calculations for volumetric accuracy. Referring now to the drawings and in particular to FIG. 1, a first automated peritoneal dialysis ("APD") system 10a of the present disclosure includes an APD machine or cycler 20a that operates with a disposable set 100a. APD machine or cycler 20a includes a housing 22a onto or into which disposable set 100a is placed for treatment. Housing 22a in the illustrated embodiment is a rigid structure, which may be made of a polymer or plastic, such as, polyvinyl chloride ("PVC"), polyethylene ("PE"), polyurethane ("PU") and/or polycarbonate ("PC"), and/or of metal, such as stainless steel, steel or aluminum. Disposable set 100a may include flexible, rigid and/or semirigid structures, e.g., sheets, bellows disks and tubing, which may be made of a polymer or plastic, such as any one or more of the polymers or plastics listed above.

In the illustrated embodiment, disposable set 100a is at least substantially horizontally disposed on or within housing 22a of cycler 20. Disposable set 100a may include registration holes 102 that position the disposable set properly on housing 22a of cycler 20. Disposable set 100a may be formed of first and second flexible plastic sheets that are welded together to form dialysis fluid pathways or lines (or around flexible tubes), such as upstream patient line 104a, downstream patient line 104b, upstream drain line 104c, downstream drain line 104d, and dialysis fluid supply lines 104e to 104g. An internal bypass pathway or line 104h is provided in the illustrated embodiment leading from a patient line expandable chamber 108a to downstream drain line 104d. Bypass pathway or line 104h may be used for priming, to reject dialysis fluid to drain or for other reasons as desired. Disposable set 100a is accordingly relatively simple, consisting primarily of the first and second sheets 112a, 112b, the rigid disposable bellows disks discussed below in connection with FIGS. 7 and 8, tubing 106b, 106d and 106e to 106g and associated containers, such as dialysis fluid supply containers and possibly a drain container.

Upstream patient line 104a, downstream patient line 104b, upstream drain line 104c, downstream drain line 104d, and dialysis fluid supply lines 104e to 104g are each in one embodiment provided with valve seats that operate respectively with valves 24a to 24g provided by cycler 20a. Valves 24a to 24g may be electrically actuated solenoid pinch valves that are spring closed and energized open for fail safe operation upon power loss.

Certain dialysis fluid pathways or lines connect to or otherwise communicate fluidly with flexible tubes leading from disposable set 100a, such as patient in/out tube 106b communicating fluidly with downstream patient line 104b, drain in/out tube 106d communicating fluidly with downstream drain line 104d, and dialysis fluid supply tubes 106e to 106g communicating fluidly with dialysis fluid supply lines 104e to 104g. Upstream patient line 104a and downstream patient line 104b are provided upstream and downstream, respectively, from a patient line expandable chamber 108a. Upstream drain line 104c and downstream drain line 104d are provided upstream and downstream, respectively, from a drain line expandable chamber 108b.

Upstream patient line 104a, upstream drain line 104c and dialysis fluid supply lines 104e to 104g are each placed in dialysis fluid communication with a disposable portion 110 of the dialysis fluid pump. The dialysis fluid pump may be any kind of mechanical pump capable of generating positive and negative pressure for pumping fresh dialysis fluid to the patient and used dialysis fluid from the patient, respectively. In the primary embodiment of system 10a, the dialysis fluid pump is a bellows pump, which includes a reusable portion and disposable portion 110. The bellows pump is expanded to draw fresh or used dialysis fluid into the disposable portion and contracted to push fresh or used dialysis fluid from the disposable portion. In alternative embodiments, the dialysis fluid pump may be a bidirectional peristaltic pump, a lobed pump, centrifugal pump, gear pump, vane pump, for example. If a peristaltic pump, disposable portion 110 is instead a peristaltic pumping tube, which for example may have one end placed in fluid communication with upstream patient line 104a and the other end placed in fluid communication with a Y-connector, for example, that branches to (i) upstream drain line 104c and (ii) dialysis fluid supply lines 104e to 104g.

Figure 2:
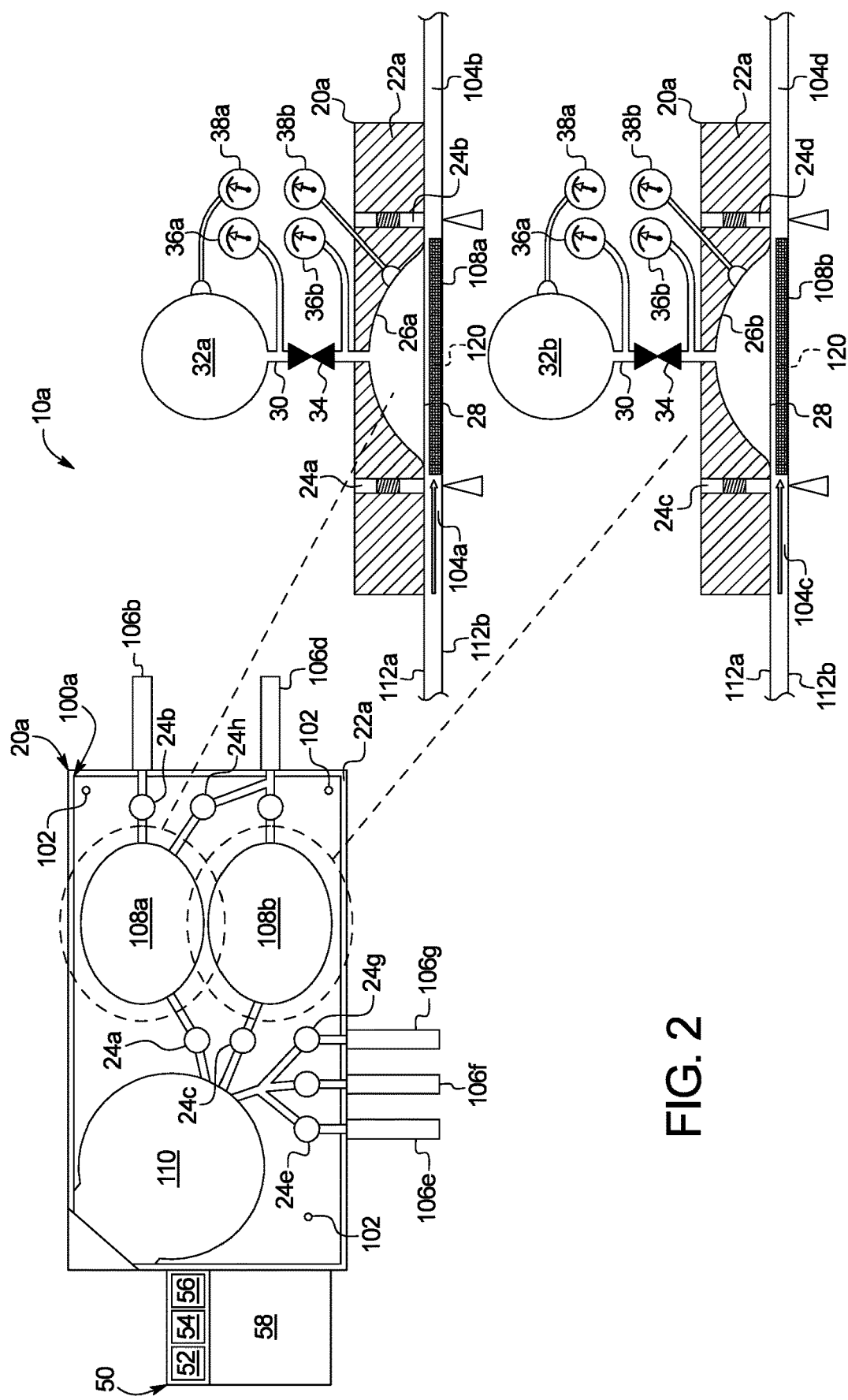
FIG. 2 provides a top plan and elevation sectioned views of a relevant portion of the cycler and disposable set of the first primary embodiment of present disclosure.

Referring additionally to FIG. 2, patient line 104a/104b and drain line 104c/104d are each provided with a flexible or expandable chamber 108a, 108b, respectively, such as a circular or elliptical expandable chamber, which may be formed from first and second flexible sheets 112a, 112b of plastic. Disposable expandable chambers 108a, 108b are aligned respectively with inwardly extending domes 26a, 26b formed in a surface of a cycler housing 22a, which also houses the reusable portion of the dialysis fluid pump actuator as discussed below, which operates with the disposable portion 110 of the dialysis fluid pump. Domes 26a, 26b in the illustrated embodiment may be covered with a reusable diaphragm 28 that flexes with flexible sheet 112a of the respective chamber 108a, 108b when placed under positive pressure. Reusable diaphragm 28 may be made of any of the materials listed above or of a rubber, such as silicone or polyurethane rubber. A pneumatic passageway 30 of cycler 20a extends from each dome 26a, 26b to a fixed volume reference chamber 32a, 32b. An electrically actuated pneumatic valve 34 is placed along each pneumatic passageway 30. Pressure sensors 36a, 36b, and possibly temperature sensors 38a, 38b, are placed on either side of each pneumatic valve 34 so that the pneumatic pressure inside both domes 26a, 26b and reference chambers 32a, 32b may be measured when the respective pneumatic valve 34 is closed.

APD system 10a is configured to use flexible or expandable chamber 108a of disposable set 100a and the mating dome 26a and reference chamber 32a of cycler 20a for the patient line 104a/104b to measure, under positive pressure, incremental volumes of fresh dialysis fluid delivered to flexible or expandable chamber 108a and thus to the patient. The incremental volumes in an embodiment are pressurized to a desired safe pumping pressure for the patient via pressure sensor 36b, e.g., three psig, by opening inlet valve 24a to flexible or expandable chamber 108a and closing outlet valve 24b from the flexible or expandable chamber. Once the desired patient pumping pressure is reached and the pressure measurements discussed herein are taken, inlet valve 24a is closed and the outlet valve 24b is opened, allowing the fresh, heated dialysis fluid, positively pressurized to a safe patient pressure, to be delivered to the patient.

FIG. 2 also illustrates that system 10a includes a control unit 50 for the first primary embodiment for APD cycler 20a (also provided for system 10b). Control unit 50 in the illustrated embodiment includes one or more processor 52, one or more memory 54 and one or more video controller 56 for controlling the video monitor of a user interface 58. User interface 58 outputs treatment data to the patient or user (visually and/or audibly) and includes a touch screen and/or one or more membrane switches for inputting commands or other information from the patient or user into control unit 50. User interface 58 may alternatively or additionally be a handheld user interface, e.g., provide via the patient's or user's smartphone. Control unit 50 is provided for powering and controlling the pump actuator, pneumatic valve 34, pinch valves 24a to 24g and a dialysis fluid heater, which may be an inline or batch heater as discussed herein. Control unit 50 also receives signals from pressure sensors 36a and 36b and temperature sensors 38a and 38b to determine the incremental volumes using the ideal gas law as described herein, to control fresh and used dialysis fluid pumping pressures, and to control the inline or batch heater. Control unit 50 may also communicate bidirectionally with a network, e.g., the internet, for sending treatment data to and receiving prescription instructions from a doctor's or clinician's server interfacing with a doctor's or clinician's computer.

Figure 3:
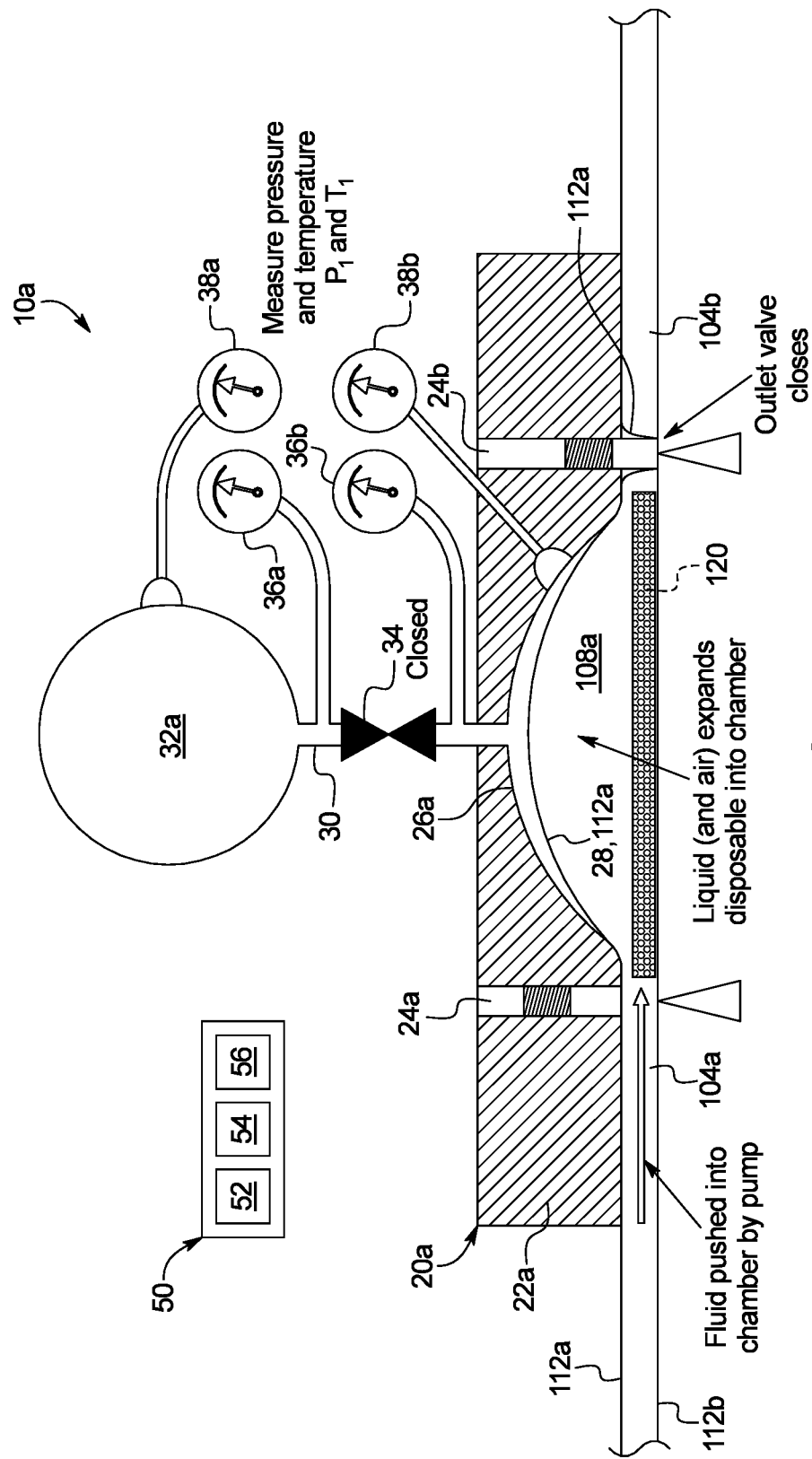
FIG. 3 is an elevation sectioned view of a relevant portion of the cycler and disposable set of the first primary embodiment of present disclosure operating in a first portion of an ideal gas law evaluation.
Figure 4:
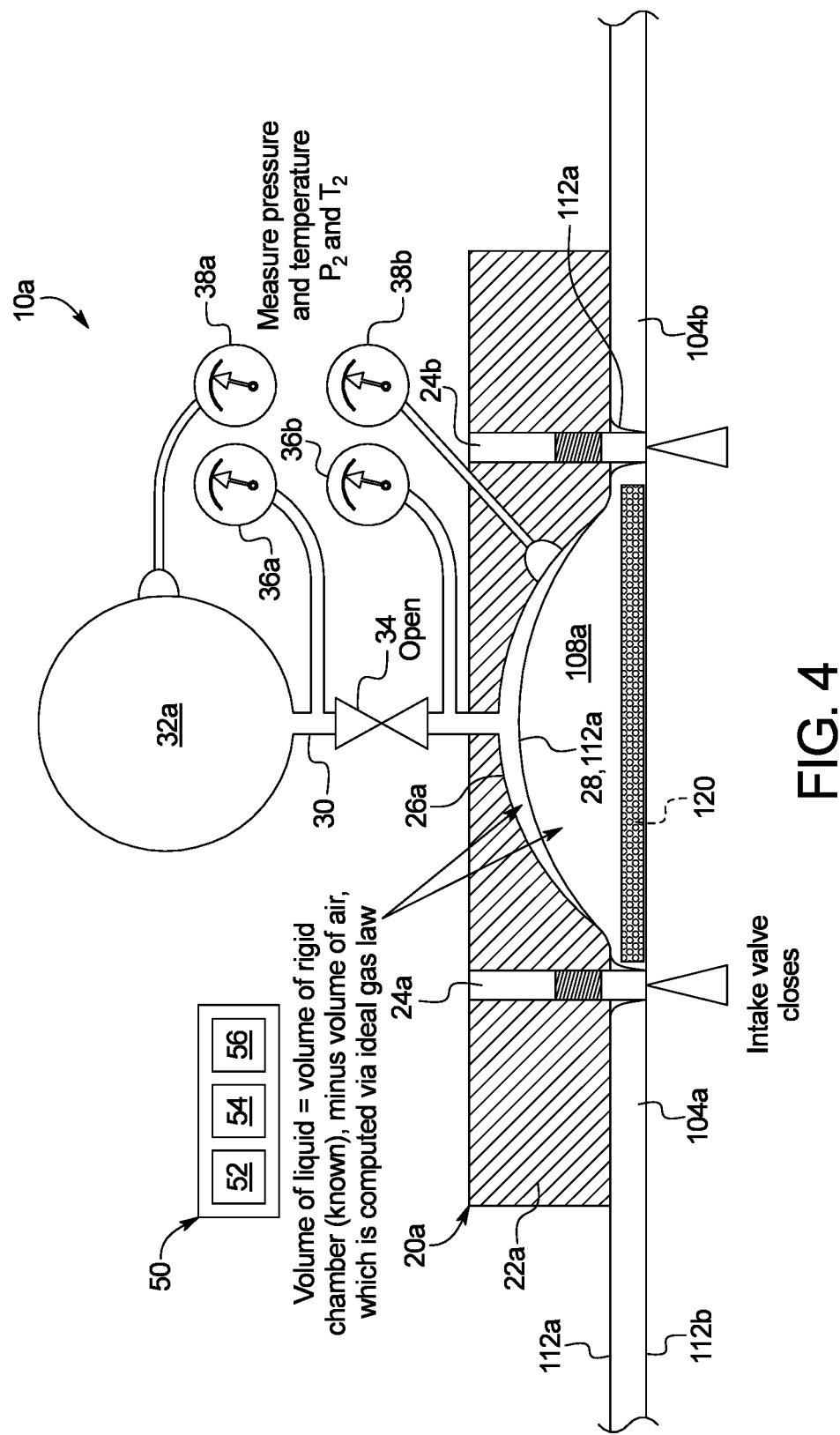
FIG. 4 is an elevation sectioned view of a relevant portion of the cycler and disposable set of the first primary embodiment of present disclosure operating in a second portion of an ideal gas law evaluation.

FIGS. 3 and 4 illustrate one embodiment for accurately measuring the incremental volume of fresh dialysis fluid delivered to the patient. In FIG. 3, pneumatic valve 34 is closed to close pneumatic passageway 30 to isolate dome 26a from reference chamber 32a prior to the chamber being filled with dialysis fluid in one embodiment. Then, with chamber inlet valve 24a open and chamber outlet valve 24b closed, the pump actuator of cycler operating with disposable portion 110 of the dialysis fluid pump is actuated to fill the chamber with fresh dialysis fluid. Flexible sheet 112a at patient line expandable chamber 108a in combination with reusable diaphragm 28 flex upwardly together into dome 26a as illustrated in FIG. 3. Once the desired pumping pressure is reached, e.g., three psig (as measured by dome pressure sensor 36b), a first pneumatic ideal gas law pressure reading ($P_1$ and possibly temperature reading $T_1$) for the reference chamber is taken by the reference chamber pressure sensor 36a (and possibly by reference chamber temperature sensor 38a).

In FIG. 4, control unit 50 causes chamber inlet valve 24a to close, and with the chamber outlet valve 24b still closed, causes pneumatic valve 34 along pneumatic passageway 30 to reference chamber 32a to open, enabling the pneumatic pressure between dome 26a and reference chamber 32a to equalize. Flexible sheet 112a at patient line expandable chamber 108a and reusable diaphragm 28 remain flexed upwardly together inside dome 26a. The dome and reference chamber pressure sensors 36a and 36b at this point read the same values $P_2$ to control unit 50, which are slightly less than the pressure, e.g., three psig, set in FIG. 3 due to the increased air volume provided between reusable diaphragm 28 and pneumatic passageway 30. The dome and reference chamber temperature sensors 38a and 38b may or may not read the same values T2 to control unit 50 in FIG. 4 (but are likely close). It should be appreciated that including the temperature measurements in the ideal gas law calculations achieves greater volumetric accuracy. If a reduced accuracy is acceptable, then the temperature change can be ignored.

Since the volume of reference chamber 32a is known (before volume $V_1$), and the before ($P_1$) and after ($P_2$) pressures have been measured and are thus known, the "after" volume $V_2$ may then be calculated using the ideal gas law $P_1*V_1=P_2*V2$ (where before and after temperatures ($T_1$ and $T_2$) may or may not be factored in), wherein the measured volume is of any air that may reside in dome 26a, either above reusable diaphragm 28 or mixed in the dialysis fluid residing within flexible or expandable or expandable chamber 108a. The incremental fresh dialysis fluid volume delivered to flexible or expandable chamber 108a within dome 26a (and assumed to be the incremental fresh dialysis fluid volume delivered to the patient) is then the known volume of dome 26a less the calculated air volume ($V_2$-$V_1$).

Figure 5:
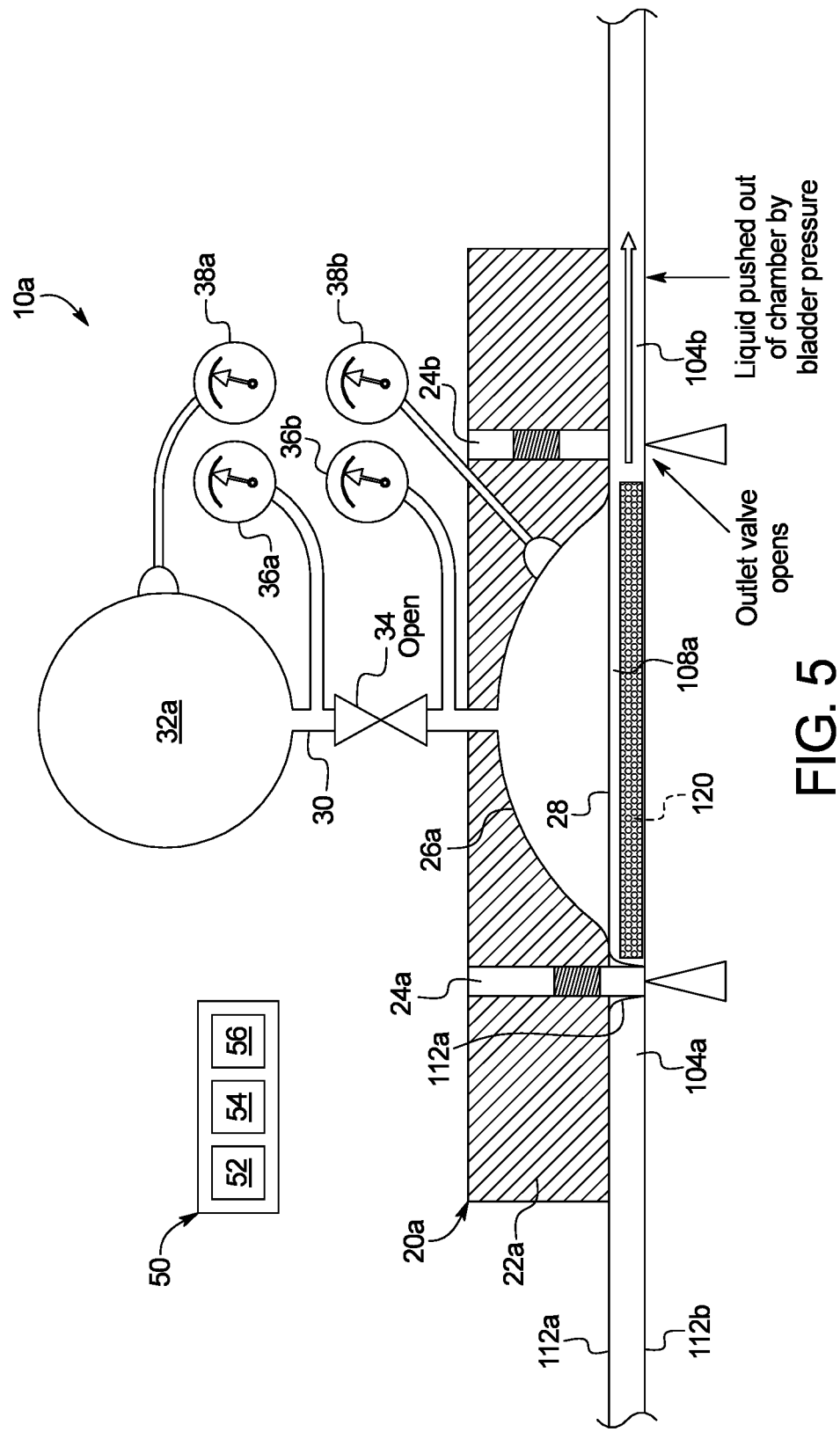
FIG. 5 is an elevation sectioned view of a relevant portion of the cycler and disposable set of the first primary embodiment of present disclosure performing a dialysis fluid discharge.

FIG. 5 illustrates that after the incremental volume of fresh dialysis fluid is determined in FIGS. 3 and 4, control unit 50 causes outlet valve 24b to open, allowing the known incremental volume of fresh dialysis fluid to be delivered to the patient at approximately, slightly less than, the desired pressure set in FIG. 3. The steps in FIGS. 3 to 5 are repeated until a prescribed total volume of fresh dialysis fluid is delivered to the patient, which control unit 50 determines by adding the incremental volumes determined in FIGS. 3 and 4. FIG. 5 illustrates that pneumatic valve 34 in pneumatic passageway 30 remains open in one embodiment as fresh dialysis fluid is discharged from flexible or expandable chamber 108a, allowing the pressure in both dome 26a and reference chamber 32a to return to whatever pressure resides in flexible or expandable chamber 108a and downstream patient line 104b at the end of the fresh fluid discharge.

The fresh dialysis fluid is sourced from a dialysis fluid supply container (connected to one of dialysis fluid supply tubes 106e to 106g), which may operate with a batch heater (not illustrated). Where batch heating is provided and the initial dialysis fluid supply container has been emptied, control unit 50 may either cause the dialysis fluid pump to pump from a second dialysis fluid supply container directly into the first dialysis fluid supply container associated with the batch heater, e.g., during a patient dwell, bypassing flexible or expandable chamber 108a since volumetric accuracy and pressure control for this operation is not critical. In an alternative embodiment, control unit 50 controls an inline heater to heat dialysis fluid flowing through patient line 104a/104b or patient in/out tube 106b as it is being delivered to the patient. In any case, fresh dialysis fluid is delivered to the patient heated to body temperature, e.g., 37° C., in one embodiment.

Referring again to FIG. 2, APD system 10a is configured to use the drain line expandable chamber 108b of the disposable set 100a and mating dome 26b and reference chamber 32b of cycler 20a for drain line 104c/104d to measure, under positive pressure, incremental volumes of used dialysis fluid delivered to drain, e.g., a drain container or house drain attached to or downstream from drain in/out tube 106d. Control unit 50 causes the incremental volumes in an embodiment to be pressurized to a desired safe system pressure since this operation is isolated from the patient. The safe system pressure may be higher than the patient pumping pressure, which is achieved by opening inlet valve 24c to drain line expandable chamber 108b and closing outlet valve 24d from the flexible or expandable chamber. Once the desired system pressure is reached, inlet valve 24c is closed and the outlet valve 24 is opened, allowing the used dialysis fluid, positively pressurized to a safe system pressure, to be discharged to the drain.

Control unit 50 controls volumetric accuracy for the incremental volumes of used dialysis fluid delivered to drain in the same manner as described above in FIGS. 3 and 4 for the patient incremental volumes, except here disposable drain line expandable chamber 108b and associated fluid valves 24c and 24d, reusable cycler dome 26b and its reusable flexible diaphragm 28, reference chamber 32b, pneumatic isolation valve 34 and associated pressure sensors 36a, 36b and possibly temperature sensors 38a, 38b for drain line 104c/104d are used instead. Control unit 50 adds used dialysis fluid incremental volumes until a patient drain completion criterion is met. The patient drain completion criterion may be a sensed criterion, such as the negative used dialysis fluid pressure measured by pressure sensor 36b associated with patient line dome 26a increasing sharply as patient effluent within the patient becomes empty. The patient drain completion criterion may be a prescribed criterion, such as a prescribed amount of used dialysis or effluent being removed from the patient. Control unit 50 may determine an amount of ultrafiltration removed from the patient over a treatment by subtracting the totaled patient fill volumes for each of the patient fills of the treatment from the totaled patient drain volumes for each of the patient drains of the treatment.

Regarding reference chambers 32a and 32b, it should be appreciated that a desired permanent pressure may be maintained between reference chambers 32a, 32b and respective domes 26a, 26b, which are in a sealed relationship to each other. It should also be appreciated that if slow leaks become a problem between reference chambers 32a, 32b and respective domes 26a, 26b, the sealed area may be mechanically pressure charged to a desired permanent pressure at the start of treatment, e.g., via a bellows linked to a disposable door having check and pressure relief valves.

Figure 6:
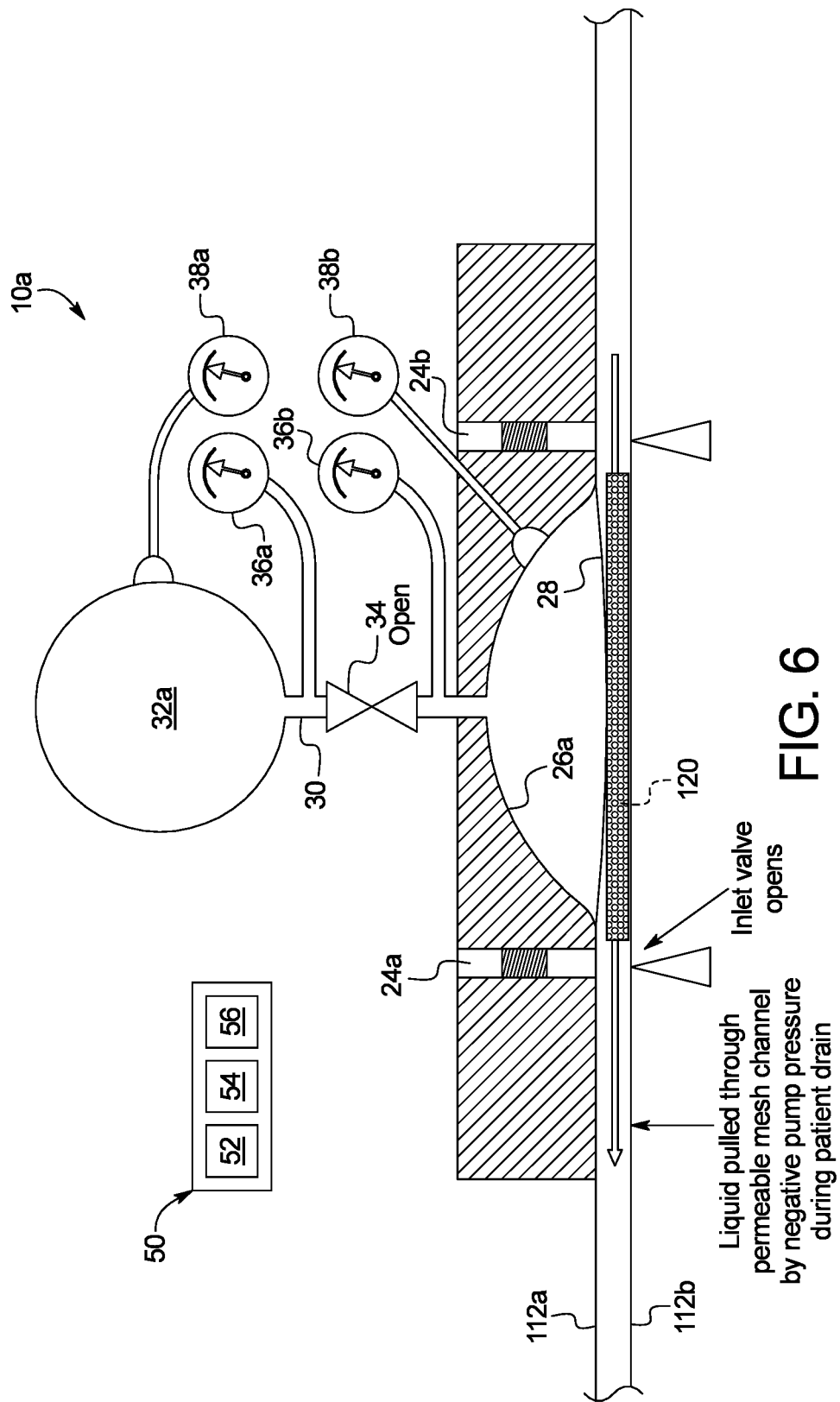

As illustrated in FIGS. 1 and 2, used dialysis fluid is sourced from the patient (via patient in/out tube 106b) and thus passes in a reverse direction under negative pressure through patient line expandable chamber 108a of disposable set 100a as illustrated in FIG. 6. Because patient line expandable chamber 108a is placed under negative pressure via the dialysis fluid pump during drain, it is contemplated to provide patient line expandable chamber 108a with a liquid permeable mesh 120 that prevents flexible sheets 112a and 112b forming patient line expandable chamber 108a from collapsing together under negative pressure.

Figure 7:
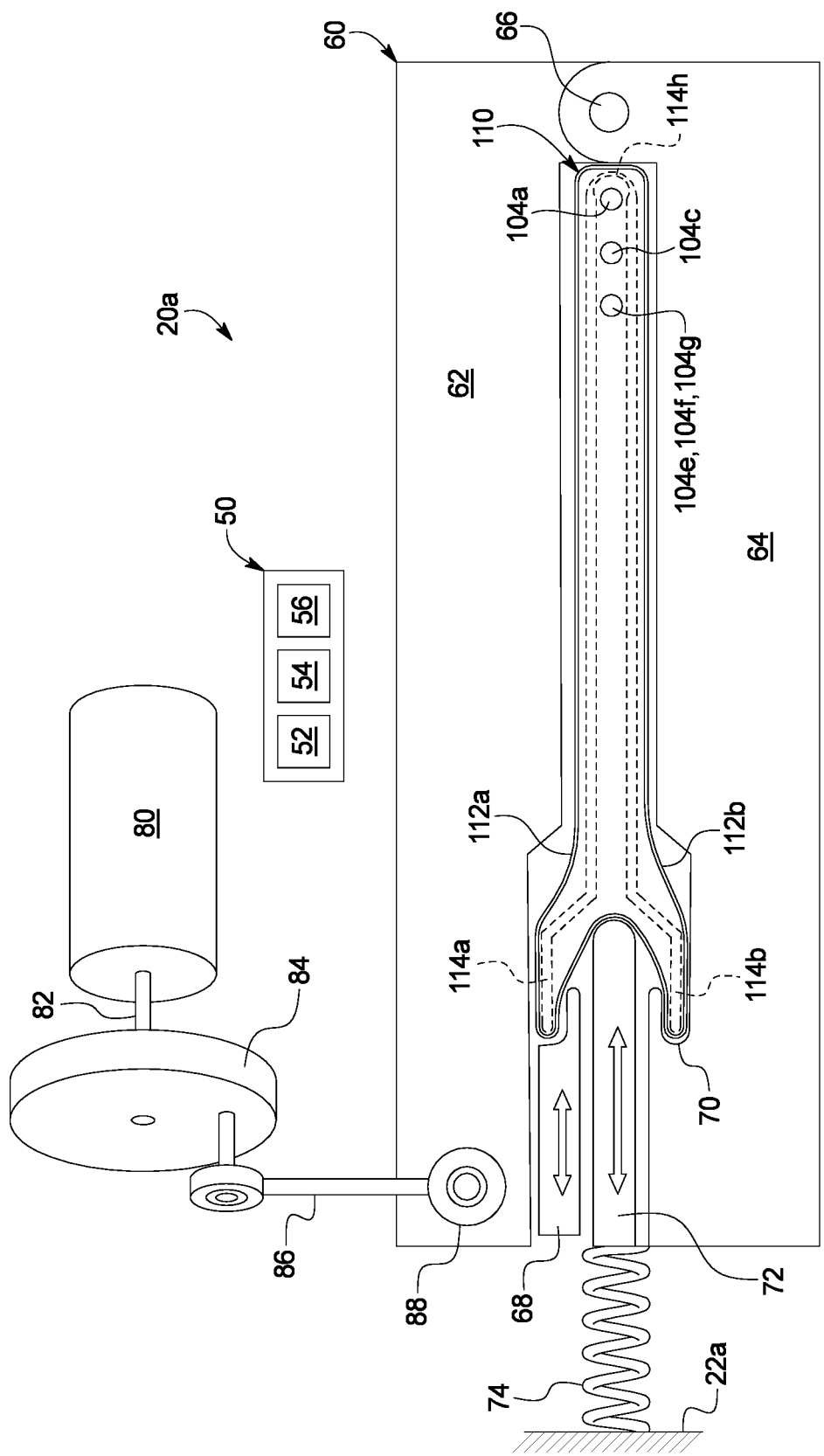
FIGS. 7 and 8 are elevation views of a relevant portion of the cycler and disposable set illustrating one embodiment for a bellows pump operable with the first primary embodiment.

As mentioned above, in one primary embodiment the dialysis fluid pump is a bellows pump, which includes a reusable portion and a disposable portion 110. FIG. 7 illustrates that in one embodiment, a pump actuator or reusable portion 60 of the bellows pump includes two clamshell halves 62 and 64 that are hinged together at hinge 66 and are provided as part of cycler 20a. A sliding latch 68 is provided, which slides back and forth to hold a free end of one of a pair of rigid disposable bellows disks 114a and 114b of disposable portion 110. Sliding latch may be spring-loaded and biased to be closed in the position illustrated in FIG. 7. Latch 68 operates with one of the clamshell halves, e.g., an upper clamshell half 62, to trap and hold the free end of, e.g., upper, rigid disposable bellows disk 114a. The other clamshell half, e.g., the lower clamshell half 64, includes or defines a notch 70 that accepts the other e.g., lower, rigid disposable bellows disk 114b.

Thus to load the bellows disposable 110 in one example, the user opens clamshell halves 62 and 64 and places one of the disposable bellows disks, e.g., lower disk 114b, in lower clamshell half 64 and the slides the free end of lower bellows disk 114b into notch 70 of the lower clamshell half. The user then slides latch 68 open so that upper bellows disk 114a may be placed against upper clamshell half 62, after which latch 68 is released, and which is self-biased to close so that bellows disposable 110 is locked removeably in place for operation with bellows pump actuator 60 during an APD treatment. To remove bellows disposable 110 after treatment, the user reverses the manual steps just described.

The pair of rigid disposable bellows disks 114a, 114b in the illustrated embodiment are sealed within a flexible plastic container or bag formed via first and second flexible sheets 112a, 112b of plastic in one embodiment. The flexible plastic container or bag receives and discharges fresh and used dialysis fluid as rigid disposable bellows disks 114a and 114b are angled apart and angled together respectively. In the illustrated embodiment, rigid disposable bellows disks 114a and 114b are hinged together, e.g. via a living hinge 114h at their non-free ends, and wherein the container or bag of sheets 112a, 112b follows the radius of hinge 114h.

The container or bag at the free ends of the rigid disposable bellows disks 114a and 114b is in one embodiment tensioned via a reusable spring-loaded tensioner 72 provided between first and second clamshell halves 62 and 64. Tensioner 72 ensures that the container or bag remains taught about disposable bellows disks 114a, 114b throughout the pumping process using the bellows pump. When rigid disposable bellows disks 114a, 114b are angled apart (FIG. 8), the container or bag straightens, causing a spring 74 of the spring-loaded tensioner 72 to compress. When rigid disposable bellows disks 114a, 114b are angled together (FIG. 7), the container or bag folds, allowing spring 74 of spring-loaded tensioner 72 to expand to maintain the container in a taught state. In an embodiment, spring is mounted against a wall or other solid, immovable structure of housing 22a of cycler 20a.

Figure 8:
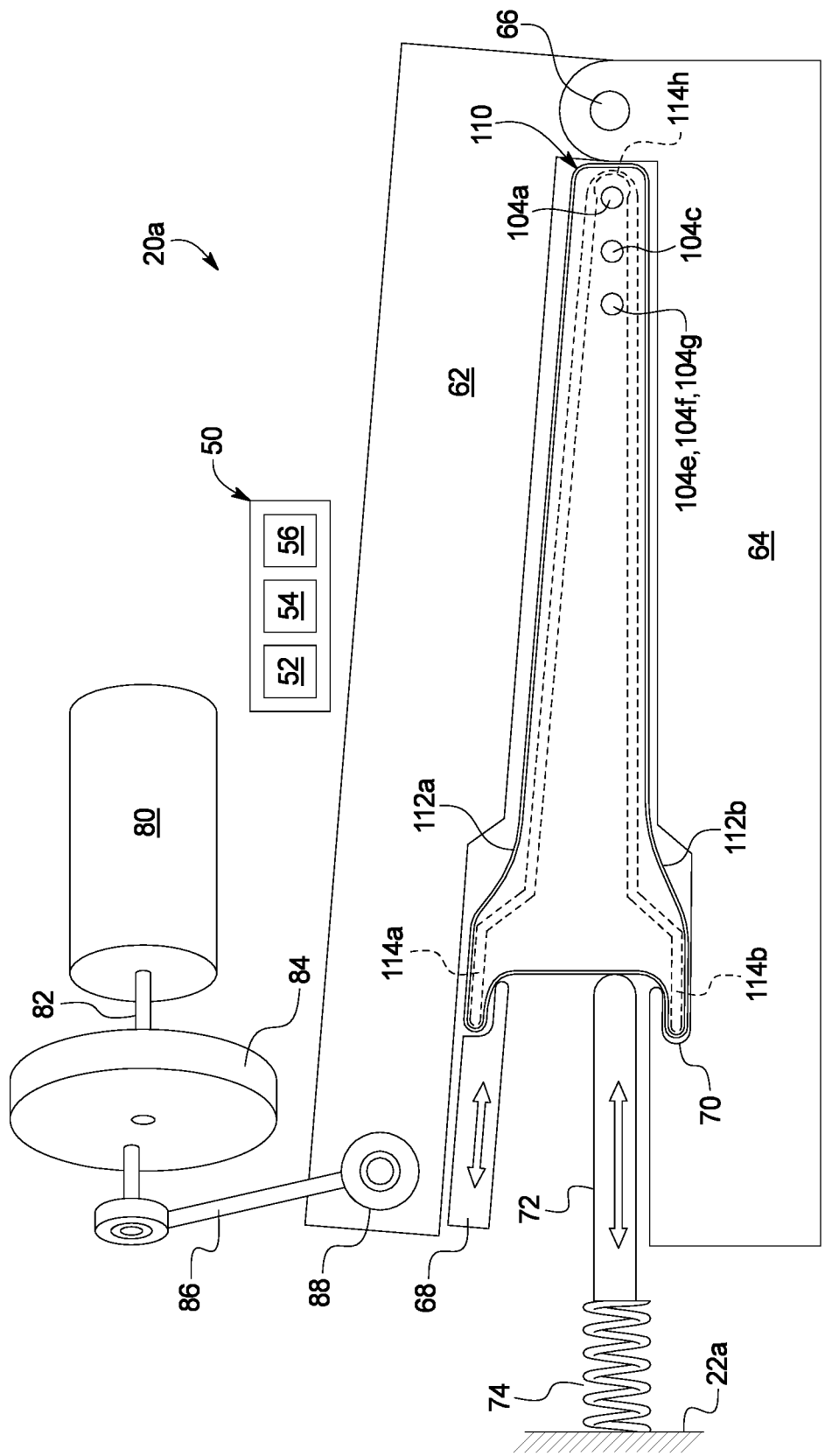

As discussed herein, disposable set 10a of the first primary embodiment includes first and second flexible polymer or plastic sheets 112a, 112b that form the container about rigid disposable bellows disks 114a, 114b of the disposable portion 110 of the bellows pump. Rigid disposable bellows disks 114a, 114b may be rigid or semirigid and be made of any of the polymer materials or plastics discussed herein. Plastic sheets 112a, 112b also form fluid passageways extending to and sealing to tubes leading to dialysis fluid supply containers, the patient and the drain. FIGS. 1 and 2 illustrate three passageways leading to disposable portion 110 of the bellows pump. FIGS. 7 and 8 illustrate that the container or bag formed via first and second flexible polymer or plastic sheets 112a, 112b includes apertures for communicating in a fluidly sealed manner with upstream patient line or passageway 104a, upstream drain line or passageway 104c, and any one or more of dialysis fluid supply lines or passageways 104e to 104g.

Cycler 20a in the first primary embodiment includes a motor 80 and a gear or a gearhead motor 80 that includes a set of built-in gears, e.g., helical gears. The gears are provided in a ratio that slows the rotational output of motor 80 to a rotational frequency that corresponds to a desired pumping frequency. In one embodiment, a single rotation of motor 80 corresponds to an opening and closing of bellows disposable 110. In the illustrated embodiment, a shaft 82 extending from the gear or gearhead motor 80 is connected to a collar or pulley 84. A linkage 86 is connected rotatably to collar 84 at one end and is connected rotatably at the other end 88 to one of the clamshell halves, e.g., the upper clamshell half 62. Control unit 50 directs current to motor 80 such that gear or gearhead shaft 82 turns collar or pulley 84 at the geared down rotational speed, which causes linkage 86 to move from say a fully closed or discharged position at six o'clock (FIG. 7) to a fully opened or drawn-in position at twelve o'clock (FIG. 8 shows a partially opened position at about nine o'clock), thereby opening the bellows disposable for drawing fresh or used dialysis fluid into same. Control unit 50 directs current to motor 80 such that gear or gearhead shaft further 82 turns collar or pulley 84 at the geared down rotational speed, which causes linkage 86 to move back from twelve o'clock to six o'clock, thereby closing the bellows disposable, pushing fresh or used dialysis fluid from same.

Cycler 20a in the first primary embodiment is configured to vary the speed of the motor 80 to achieve a desired fresh or used dialysis fluid flowrate and pressure. Pushing fresh dialysis fluid to the patient or drawing used dialysis fluid from the patient is controlled to be within safe patient pumping limits, e.g., at or below three psig for positive pressure patient pumping or at or below −1.5 psig for negative pressure patient pumping. Other pumping, such as pumping used dialysis fluid to drain, drawing fresh dialysis fluid into bellows disposable 110 or pumping fresh dialysis fluid to a heating container (not illustrated) may be performed at a higher safe system pressure because the patient is not involved in such pumping. Pressure to the patient is controlled as described above in connection with FIGS. 3 and 4. Depending on the volume of bellows disposable 110 versus the volumes of patient line expandable chamber 108a and drain line expandable chamber 108b, a partial rotation, a single rotation or multiple rotations of gear or gearhead shaft 82 may be needed to fill chambers 108a, 108b to a desired positive pressure.

Pressure from the patient is controlled during the operation of motor 80. Here, control unit 50 monitors pressure sensor 36b associated with patient line expandable chamber 108a, and uses the negative pressure readings as feedback to control the speed of motor 80 such that the pressure at pressure sensor 36b reads out at or below the safe negative patient pressure limit. Control unit 50 controls motor speed by controlling current to the motor in one embodiment.

Figure 9:
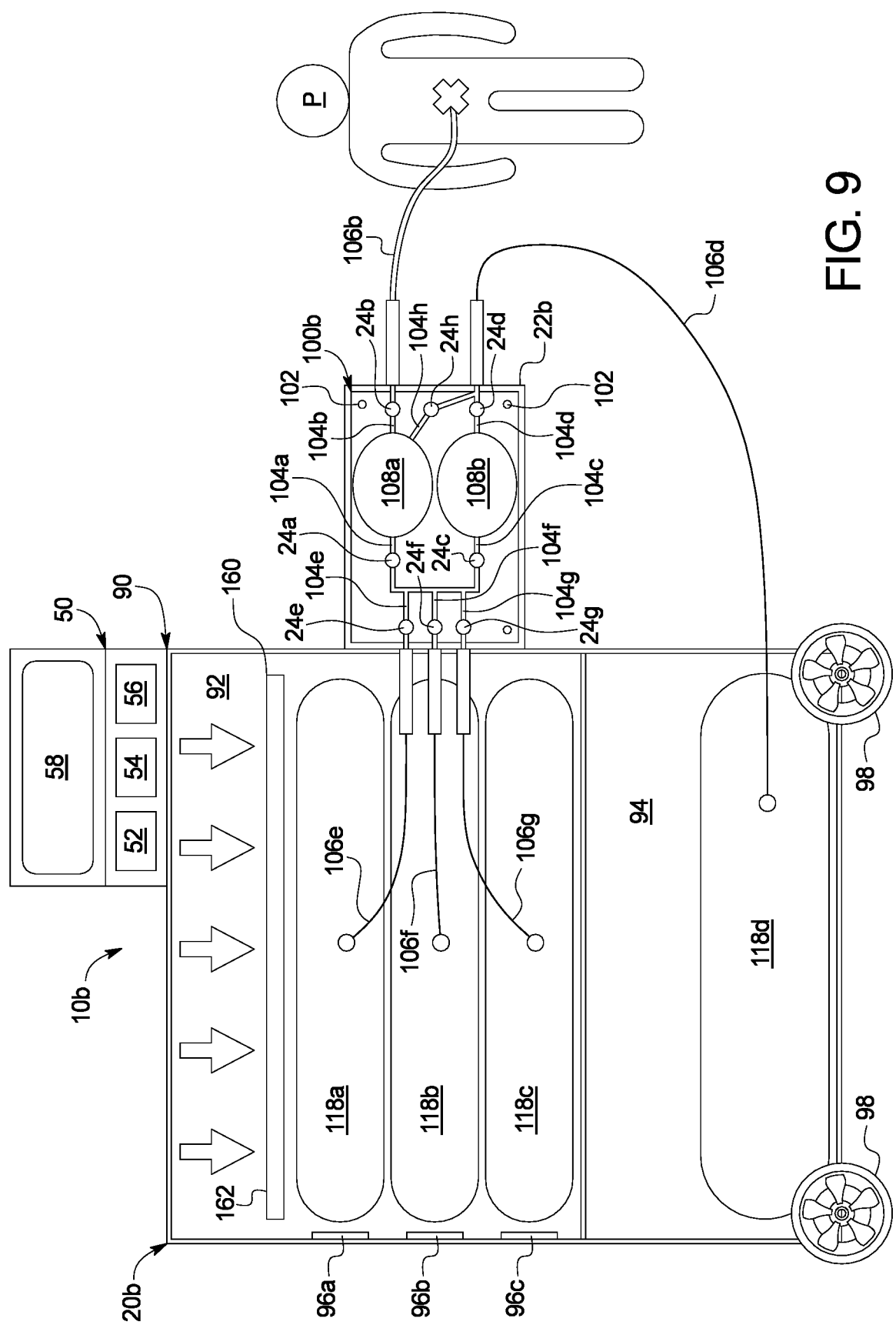
FIG. 9 is an elevation view of a second primary embodiment of the present disclosure illustrating the ideal gas law structure and functionality of the first primary embodiment operation with a peritoneal dialysis cart.
Figure 10:
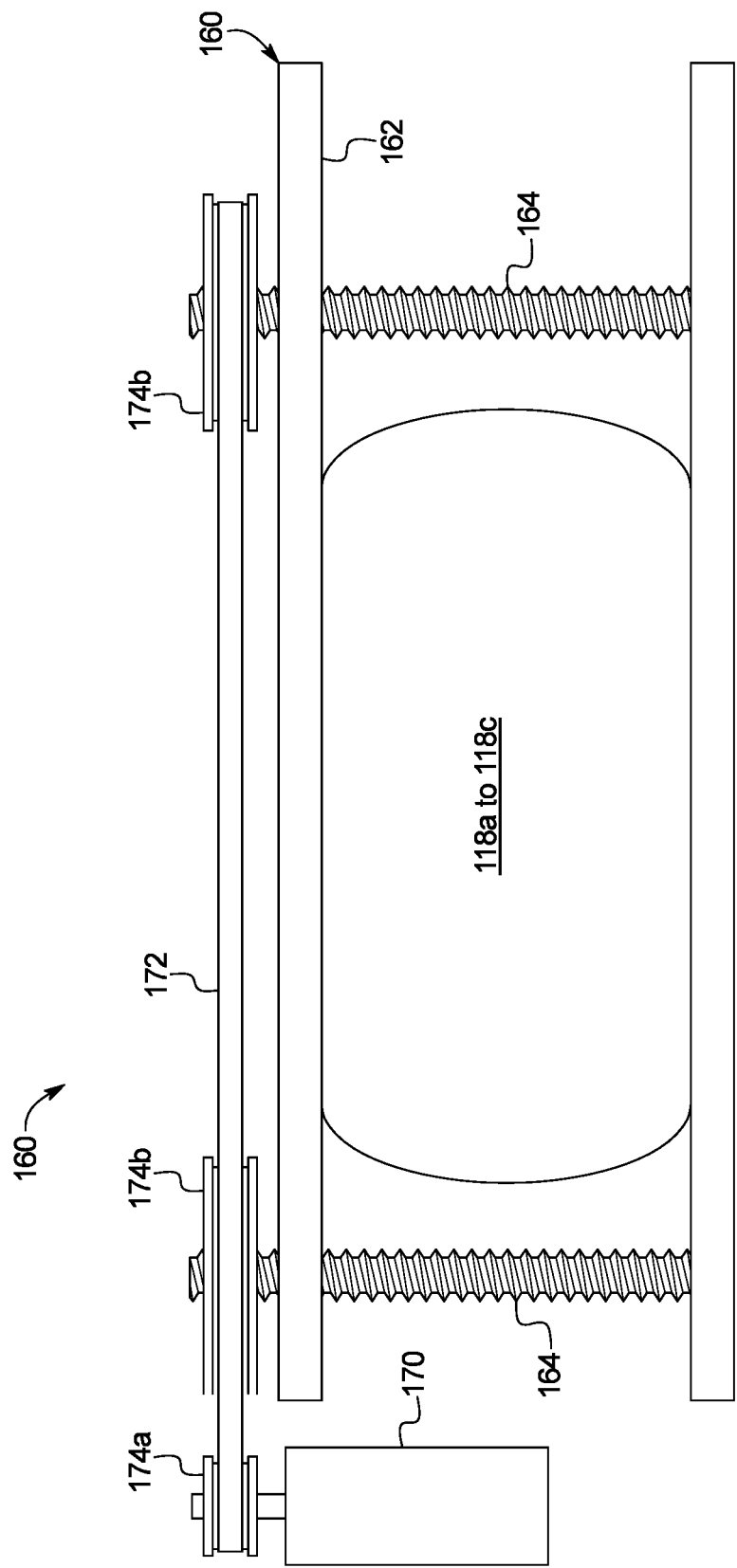
FIG. 10 is an elevation view of one embodiment of an automated mechanism or pump actuator useable with the peritoneal dialysis cart of a second primary embodiment of the present disclosure.

Referring now to FIGS. 9 and 10, cycler 20b in the second primary system 10b of the present disclosure operates on the same principals as the first primary embodiment, in which a mechanism for delivering fresh, heated dialysis fluid to the patient is provided, and which includes disposable expandable patient and drain line chambers 108a, 108b, which enable incremental fresh and used dialysis fluid volumes to be measured and accumulated. The sequence of inlet valves 24a, 24c and outlet valves 24b, 24d selectively opening and closing patient line 104a/104b and drain line 104c/104d and pressure measurements taken via pressure sensors 36a, 36b and possibly temperature sensors 38a, 38b for use in the ideal gas law calculation described in connection with system 10b, including control unit 50, are the same as described above in FIGS. 3 and 4 for system 10a.

FIG. 9 illustrates that disposable set 100b also includes registration holes 102 that position the disposable set properly on housing 22b of cycler 20b and defines dialysis fluid supply lines 104e to 104g that connect respectively to dialysis fluid supply tubes 106e to 106g, which in turn extend respectively to dialysis fluid supply containers or bags 118a to 118c. Disposable set 100b further includes patient in/out tube 106b communicating fluidly with downstream patient line 104b and extending to patient P and drain in/out tube 106d communicating fluidly with downstream drain line 104d and extending to drain container 118d. Cycler 20b of also provides the pneumatic valve 34 and inwardly extending domes 26a, 26b for operating with expandable patient and drain line chambers 108a, 108b.

Control unit 50 again controls all valves 24a to 24h, the dialysis fluid heater, pneumatic valve 34, accepts readouts from sensors 36a, 36b, 38a, 38b and any other sensors, and runs all the ideal gas law determinations discussed above. Control unit 50 receives signals from pressure and temperature sensors 36a, 36b, 38a, 38b to determine the incremental volumes using the ideal gas law as described herein (e.g., at FIGS. 3 and 4), to determine fresh and used dialysis fluid delivery amounts and overall patient UF, to control fresh and used dialysis fluid pumping pressures, and to control the dialysis fluid heater(s). Control unit 50 also operates bidirectionally with a user interface 58 to output treatment data to the user interface and to receive commands from same.

One main difference for the second primary system 10b is the provision of a peritoneal dialysis ("PD") cart 90 that includes an upper compartment 92 that holds fresh dialysis fluid containers 118a to 118c and a lower compartment 94 that holds one or more used dialysis fluid or drain container 118d. PD cart 90 when unloaded may be primarily empty such that it folds at least substantially flat for storage and transport. Upper compartment 92 may be insulated and include one or more heaters 96a to 96c, e.g., electrical resistance heaters, for warming the fresh dialysis fluid containers 118a to 118c. PD cart 90 further provides an automated mechanism 160 for delivering fresh, heated dialysis fluid to patient P.

FIG. 10 illustrates automated mechanism 160 (or pump actuator) in more detail. Automated mechanism 160 in the illustrated embodiment includes a press plate 162 driven by one or more lead or ball screw 164, which is/are in turn driven by a motor 170 and a belt 172 and pulleys 174a and 174b. Motor 170 (like motor 80) may be a stepper, servo, AC or DC, brushed or brushless, variable speed motor under control of control unit 50. Motor 170 drives pulley 174a, which turns timing belt (e.g., toothed), which further in turn rotates one or more lead or ball screw 164 in a direction such that press plate 162 is moved downwardly to compress dialysis fluid containers 118a to 118c, one of which is fluidically open allowing fresh, heated dialysis fluid to be forced into disposable expandable patient line chamber 108a. Motor 170 may also be a gearhead motor whose output shaft is slowed to provide a desired range of fresh dialysis fluid flowrates.

In one implementation of the second primary system 10b, automated mechanism 160 (or pump actuator) drives fresh, heated dialysis fluid to patient P. System 10b is configured such that used dialysis fluid from patient P is gravity fed to drain container 118d placed in lower compartment 94, wherein PD cart includes wheels or casters 98. Used dialysis fluid gravity flows from patient P, through the disposable expandable patient line chamber 108a, and into the disposable expandable drain line chamber 108b, where it is volumetrically measured, and from chamber 108b, through drain line 106b, to drain container 118d.

Control unit 50 for the second primary embodiment for the APD cycler is also provided for powering and controlling the motor, pinch valves and heater. The control unit also receives signals from pressure and temperature sensors to determine the incremental volumes using the ideal gas law as described herein, to control fresh and used dialysis fluid pumping pressures, and to control one or more heaters 96a to 96c. Control unit 50 also operates bidirectionally with a user interface 58 to output treatment data to the user interface and to receive commands from same.

It should be understood that various changes and modifications to the presently preferred embodiments described herein will be apparent to those skilled in the art. It is therefore intended that such changes and modifications be covered by the appended claims. For example, the end of a patient drain may be determined by control unit 50 detecting low effluent flowrate via the ideal gas law calculation discussed herein as opposed to draining to a prescribed drain. It is also contemplated to double the contents of any of the disposable sets and their corresponding actuators and sensors so that fresh and used dialysis fluid flow may be substantially continuous, e.g., as one fresh or used expandable chamber is filling with fresh or used dialysis fluid, respectively, the other fresh or used expandable chamber is discharging fresh or used dialysis fluid, respectively.

The invention is claimed as follows:

1. A peritoneal dialysis system comprising:
   a cycler including
      a pump actuator configured to pump fresh dialysis fluid,
      a dome formed in a portion of a cycler housing,
      a reference chamber provided in the cycler housing,
      a valve positioned and arranged to open and close a pneumatic pathway extending between the reference chamber and the dome,
      a pressure sensor associated with the reference chamber, and
      a control unit; and
   a disposable set including
      a disposable portion operable with the pump actuator,
      a patient line expandable chamber positionable against the dome for operation, and
      a fresh dialysis fluid pathway extending to the patient line expandable chamber for carrying fresh dialysis fluid pumped by the pump actuator from the disposable portion to the patient line expandable chamber,
   wherein the control unit is configured to cause:
      (i) the pressure sensor to take a first pressure reading of the reference chamber with the valve closed,
      (ii) the pump actuator to pump the fresh dialysis fluid through the fresh dialysis fluid pathway into the patient line expandable chamber, expanding the patient line expandable chamber into the dome,
      (iii) the valve to open, allowing the reference chamber to communicate pneumatically with any air in the dome,
      (iv) the pressure sensor to take a second pressure reading with the valve open,
      (v) the first and second pressure readings to be used with the ideal gas law to determine an amount of air in the dome, and
      (vi) the amount of air in the dome and a known volume of the dome to be used to determine an amount of the fresh dialysis fluid delivered into the patient line expandable chamber.

2. The peritoneal dialysis system of claim 1, wherein the pressure sensor is a first pressure sensor, and which includes a second pressure sensor associated with the dome, and wherein the control unit is configured to take at least one pressure reading from the second pressure sensor to control a fresh dialysis fluid discharge pressure from the patient line expandable chamber.

3. The peritoneal dialysis system of claim 1, wherein the cycler includes a dialysis fluid inlet valve operable with the disposable set upstream of the patient line expandable chamber and a dialysis fluid outlet valve operable with the disposable set downstream from the patient line expandable chamber.

4. The peritoneal dialysis system of claim 3, wherein the control unit is configured to cause at least one of:
   (a) the dialysis fluid inlet valve to be open and the dialysis fluid outlet valve to be closed during (ii),
   (b) the dialysis fluid inlet and outlet valves to be closed during (iii), or
   (c) the dialysis fluid inlet and outlet valves to be closed during (iv).

5. The peritoneal dialysis system of claim 3, wherein the control unit is further configured to cause the dialysis fluid outlet valve to open with the dialysis fluid inlet valve closed to discharge the fresh dialysis fluid from the patient line expandable chamber after the pressure sensor takes the second pressure reading.

6. The peritoneal dialysis system of claim 5, wherein the control unit is further configured to repeat (i) to (vi) and the opening of the dialysis fluid outlet valve to discharge the fresh dialysis fluid until a prescribed patient fill volume of fresh dialysis fluid is delivered to a patient.

7. The peritoneal dialysis system of claim 3, wherein the cycler further includes at least one dialysis fluid supply valve operable with the disposable set to open or occlude at least one dialysis fluid supply container.

8. The peritoneal dialysis system of claim 1, wherein the pump actuator is a bellows pump actuator, and wherein the disposable set includes a pair of rigid disposable bellows disks sealed within a flexible plastic container, the flexible plastic container in fluid communication with the fresh dialysis fluid pathway.

9. The peritoneal dialysis system of claim 1, wherein the pump actuator is a peristaltic pump actuator, and wherein the disposable set includes a peristaltic pumping tube in fluid communication with the fresh dialysis fluid pathway.

10. The peritoneal dialysis system of claim 1, wherein the pump actuator is a press plate provided with a peritoneal dialysis cart, the press plate positioned and arranged to press at least one fresh dialysis fluid supply container in fluid communication with the fresh dialysis fluid pathway.

11. The peritoneal dialysis system of claim 1, wherein the peritoneal dialysis system further includes a peritoneal dialysis cart, wherein the peritoneal dialysis cart includes a lower compartment for holding a drain container, and wherein used dialysis fluid is able to gravity drain from a patient into the drain container.

12. The peritoneal dialysis system of claim 1, wherein the cycler further includes a temperature sensor associated with the reference chamber, and wherein the control unit is further configured to use at least one reading from the temperature sensor with the ideal gas law determination in (v) to improve accuracy.

13. The peritoneal dialysis system of claim 1, wherein the dome is covered by a reusable flexible diaphragm that flexes with the patient line expandable chamber.

14. The peritoneal dialysis system of claim 1, wherein the dome is a first dome, the reference chamber is a first reference chamber, the valve is a first valve, and the pressure sensor is a first pressure sensor, the disposable set further including a drain line expandable chamber positionable against the second dome for operation and a used dialysis fluid pathway extending to the drain line expandable chamber, wherein the cycler further includes
 a second dome formed in a second portion of the cycler housing,
 a second reference chamber provided in the cycler housing,
 a second valve positioned and arranged to open and close a second pneumatic pathway extending between the second reference chamber and the second dome, and
 a second pressure sensor associated with the second reference chamber, wherein the control unit is configured to cause:
  (i) the second pressure sensor to take a first pressure reading of the second reference chamber with the valve closed,
  (ii) used dialysis fluid to be delivered through the used dialysis fluid pathway into the drain line expandable chamber, expanding the drain line expandable chamber into the second dome,
  (iii) the second valve to open, allowing the second reference chamber to communicate pneumatically with any air in the second dome,
  (iv) the second pressure sensor to take a second pressure reading with the second valve open,
  (v) the first and second pressure readings to be used with the ideal gas law to determine an amount of air in the second dome, and
  (vi) the amount of the air in the second dome and a known volume of the second dome to be used to determine an amount of the used dialysis fluid delivered into the drain line expandable chamber.

15. The peritoneal dialysis system of claim 14, wherein the pump actuator is configured to pump the used dialysis fluid through the used dialysis fluid pathway into the drain line expandable chamber.

16. The peritoneal dialysis system of claim 14, which is configured such that the used dialysis fluid is gravity fed into the drain line expandable chamber.

17. The peritoneal dialysis system of claim 14, wherein the disposable set is configured such that the used dialysis fluid flows through the patient line expandable chamber prior to delivery to the drain line expandable chamber.

18. The peritoneal dialysis system of claim 17, wherein the used dialysis fluid is pulled through the patient line expandable chamber under negative pressure, and wherein the patient line expandable chamber is provided with a structure that prevents the patient line expandable chamber from occluding under the negative pressure.

19. The peritoneal dialysis system of claim 14, which includes a third pressure sensor associated with the second dome, and wherein the control unit is configured to take at least one pressure reading from the third pressure sensor to control a used dialysis fluid discharge pressure from the drain line expandable chamber.

20. The peritoneal dialysis system of claim 14, wherein the cycler includes a dialysis fluid inlet valve operable with the disposable set upstream of the drain line expandable chamber and a dialysis fluid outlet valve operable with the disposable set downstream from the drain line expandable chamber.

21. The peritoneal dialysis system of claim 20, wherein the control unit is configured to cause at least one of:
 (a) the dialysis fluid inlet valve to be open and the dialysis fluid outlet valve to be closed during (ii),
 (b) the dialysis fluid inlet and outlet valves to be closed during (iii), or
 (c) the dialysis fluid inlet and outlet valves to be closed during (iv).

22. The peritoneal dialysis system of claim 20, wherein the control unit is further configured to cause the dialysis fluid outlet valve to open with the dialysis fluid inlet valve closed to discharge the used dialysis fluid from the drain line expandable chamber after the second pressure sensor takes the second pressure reading.

23. The peritoneal dialysis system of claim 22, wherein the control unit is further configured to repeat (i) to (vi) of claim 14 and the opening of the dialysis fluid outlet valve to discharge the used dialysis fluid until a patient drain is determined to be completed.

24. A peritoneal dialysis system comprising:
 a cart including
  a pump actuator,
  a dome,
  a reference chamber,
  a valve positioned and arranged to open and close a pneumatic pathway extending between the reference chamber and the dome,
  a pressure sensor associated with the reference chamber, and
  a control unit; and
 a disposable set including
  a disposable portion operable with the pump actuator,
  at least one fresh dialysis fluid supply container supported by the cart and positioned so as to be actuated by the pump actuator,
  a patient line expandable chamber positionable against the dome for operation, and
  a fresh dialysis fluid pathway extending to the patient line expandable chamber for carrying fresh dialysis fluid from the at least one fresh dialysis fluid supply container pumped by the pump actuator from the disposable portion to the patient line expandable chamber,
 wherein the control unit is configured to cause:
  (i) the pressure sensor to take a first pressure reading of the reference chamber with the valve closed,
  (ii) the pump actuator to pump the fresh dialysis fluid through the fresh dialysis fluid pathway into the patient line expandable chamber, expanding the patient line expandable chamber into the dome,
  (iii) the valve to open, allowing the reference chamber to communicate pneumatically with any air in the dome,
  (iv) the pressure sensor to take a second pressure reading with the valve open,
  (v) the first and second pressure readings to be used with the ideal gas law to determine an amount of air in the dome, and (vi) the amount of air in the dome and a known volume of the dome to be used to determine an amount of the fresh dialysis fluid delivered into the patient line expandable chamber.

* * * * *